US012168422B2

(12) United States Patent
Sands, II et al.

(10) Patent No.: US 12,168,422 B2
(45) Date of Patent: Dec. 17, 2024

(54) DEPLOYING STEPWAYS FOR VEHICLES AND ASSOCIATED METHODS

(71) Applicant: Globe Trekker, LLC, Beaverton, OR (US)

(72) Inventors: William Myron Sands, II, Beaverton, OR (US); Garrett Pauwels, Eugene, OR (US)

(73) Assignee: Globe Trekker, LLC, Beaverton, OR (US)

( * ) Notice: Subject to any disclaimer, the term of this patent is extended or adjusted under 35 U.S.C. 154(b) by 375 days.

(21) Appl. No.: 17/707,752

(22) Filed: Mar. 29, 2022

(65) Prior Publication Data

US 2022/0314890 A1 Oct. 6, 2022

Related U.S. Application Data

(60) Provisional application No. 63/200,822, filed on Mar. 30, 2021.

(51) Int. Cl.
*B60R 3/02* (2006.01)
(52) U.S. Cl.
CPC ..................... *B60R 3/02* (2013.01)
(58) Field of Classification Search
CPC .. B60R 3/02; B60R 3/00; B60R 3/007; E06C 5/02; E06C 5/00; E06C 5/04; E06C 5/16; B61D 23/02; B61D 23/00
See application file for complete search history.

(56) References Cited

U.S. PATENT DOCUMENTS

| 3,892,290 | A | * | 7/1975 | Lang | E06C 1/52 |
| | | | | | 182/163 |
| 4,021,071 | A | * | 5/1977 | Norman | B60R 3/02 |
| | | | | | 280/166 |

(Continued)

OTHER PUBLICATIONS

Lippert Solid Step Premium RV Steps—Quad—Lippert Company product information downloaded from www.store.lcil.com/premium-quad-solid-step-solid-step-premium-quad.html on Mar. 29, 2022.

(Continued)

*Primary Examiner* — James M Dolak
(74) *Attorney, Agent, or Firm* — Kolitch Romano Dascenzo Gates LLC

(57) ABSTRACT

The deploying stepway includes a guide frame and a step assembly. The step assembly includes a plurality of steps, a step frame pivotally coupled to the steps and including a pivot assembly, and a proximal portion and a distal portion defined on either side of the pivot assembly. The deploying stepway is configured to transition among a stair configuration, in which the proximal and distal portions are aligned and extend from the guide frame at a declined stair angle, a ladder configuration in which the distal portion is pivoted relative to the proximal portion and extends from the guide frame at a declined ladder angle, and a stowed configuration in which the step assembly is at least substantially received in the guide frame. The methods include deploying the deploying stepway from the stowed to the stair configuration and transitioning the deploying stepway from the stowed to the ladder configuration.

20 Claims, 17 Drawing Sheets

(56) References Cited

U.S. PATENT DOCUMENTS

| | | | | |
|---|---|---|---|---|
| 4,161,997 | A * | 7/1979 | Norman | B60R 3/02 182/127 |
| 5,205,603 | A * | 4/1993 | Burdette, Jr. | B60R 3/02 182/195 |
| 5,228,707 | A * | 7/1993 | Yoder | B60R 3/02 182/127 |
| 5,366,052 | A * | 11/1994 | Keh-Lin | E06C 5/02 182/127 |
| 5,617,930 | A * | 4/1997 | Elia | B60R 3/02 296/62 |
| 6,378,654 | B1 * | 4/2002 | Ziaylek, Jr. | E06C 5/02 182/127 |
| 7,025,174 | B1 * | 4/2006 | Hawley | B60R 3/02 182/127 |
| 7,168,722 | B1 * | 1/2007 | Piotrowski | B60R 3/02 280/166 |
| 7,448,637 | B2 * | 11/2008 | Parker | E06C 1/005 280/166 |
| 7,469,915 | B2 * | 12/2008 | Horn | B60R 3/02 182/86 |
| 8,091,294 | B2 * | 1/2012 | Whalen | A01K 1/035 52/182 |
| 8,113,315 | B2 * | 2/2012 | Farley | E06C 5/20 182/86 |
| 8,182,013 | B1 * | 5/2012 | Alvarado | B60R 3/007 182/127 |
| 8,246,063 | B1 * | 8/2012 | Rowland | B60R 3/02 280/166 |
| 8,668,216 | B2 * | 3/2014 | Ellement | E06C 5/28 182/127 |
| 8,678,411 | B2 * | 3/2014 | Kibler | B60R 3/02 182/127 |
| 8,689,939 | B2 * | 4/2014 | Kim | E02F 9/24 182/127 |
| 8,919,497 | B2 * | 12/2014 | Rund | B60R 3/02 182/86 |
| 9,487,148 | B2 * | 11/2016 | Kichline, Jr. | B60R 3/02 |
| 9,527,448 | B1 * | 12/2016 | Kay | E06C 5/28 |
| 9,771,025 | B1 * | 9/2017 | Nebel | B60R 3/02 |
| 9,994,141 | B1 * | 6/2018 | Hanser | B60R 3/02 |
| 9,994,159 | B2 * | 6/2018 | Giesmann | E06C 5/24 |
| 10,098,314 | B2 * | 10/2018 | Murray | A01K 1/0272 |
| 10,266,121 | B2 * | 4/2019 | Nebel | B60R 3/02 |
| 10,538,205 | B2 * | 1/2020 | Iotti | E06C 5/04 |
| 10,604,078 | B2 * | 3/2020 | Hedley | B61D 23/025 |
| 11,421,477 | B2 * | 8/2022 | Simula | E06C 1/393 |
| 11,780,373 | B2 * | 10/2023 | Salter | B62D 33/037 296/62 |
| 12,030,460 | B2 * | 7/2024 | Parack | E06C 5/04 |
| 2006/0006023 | A1 * | 1/2006 | Lim | B60R 3/02 182/127 |

OTHER PUBLICATIONS

Platinum Series—Reinforced Double Tread Electric Step Assembly—Lippert Company product information downloaded from www.store.lcil.com/platinum-series-reinforced-double-tread-electric-step-assembly-372558.html on Mar. 29, 2022.

Alumi-Tread® Manual Step—Various Configurations—Lippert Company product information downloaded from www.store.lcil.com/alumi-tread-manual-step-various-configurations-alumi-tread-man-step.html on Mar. 29, 2022.

24 Series Triple Tread Kwikee Electric Step Assembly—Various Options—Lippert Company product information downloaded from www.store.lcil.com/24-series-triple-tread-kwikee-electric-step-assembly-various-options-kwik-24-trpl-step-assy.html on Mar. 29, 2022.

SmartStep GlowStep Revolution RV Step System—Torklift International Company product information downloaded from www.torklift.com/rv/glowstep-revolution#accessories on Mar. 29, 2022.

* cited by examiner

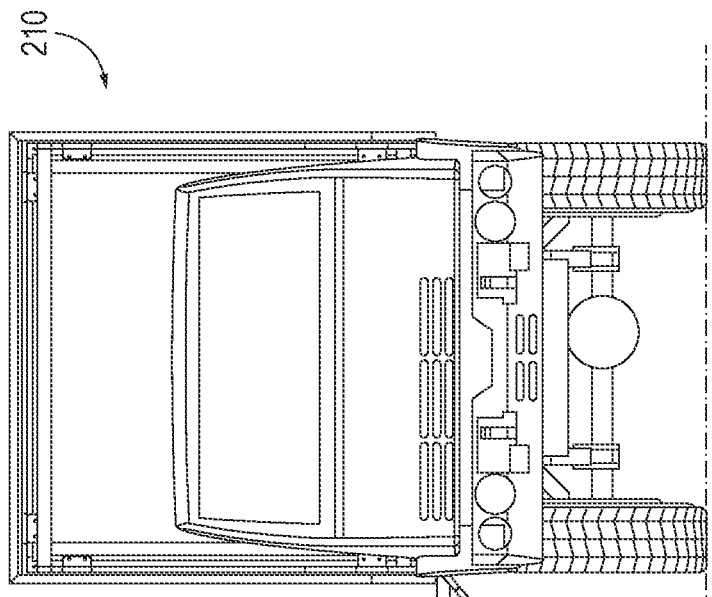
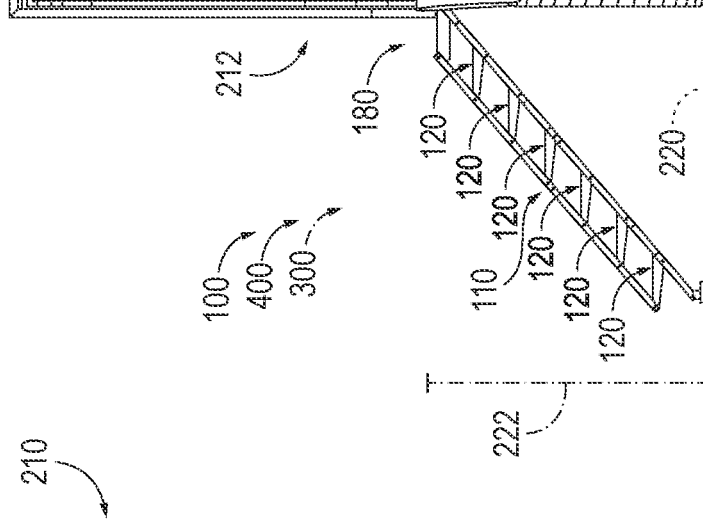
FIG. 16
FIG. 15

DEPLOYING STEPWAYS FOR VEHICLES AND ASSOCIATED METHODS

RELATED APPLICATION

This application claims priority to U.S. Provisional Patent Application No. 63/200,822, which was filed on Mar. 30, 2021 and is entitled "VEHICLE ENTRY SYSTEM," and the complete disclosure of which is hereby incorporated by reference.

FIELD OF DISCLOSURE

The present disclosure relates to deploying stepways for vehicles and related methods.

BACKGROUND OF INVENTION

Many vehicles include elevated points of entry that are most easily accessed from outside the vehicle by using some form of entry system, such as a ladder, a step, or stairs. For example, recreational vehicles (RVs) often include a door to an enclosed living space that is situated above the ground surface higher than an average person can easily reach. Accordingly, many RVs include some form of a step, stairs, or a ladder for providing easier access to these elevated doors. Typically, any entry system used with a vehicle is designed either to be stowed within or protrude minimally from the vehicle during transit. With space often being limited in vehicles, and particularly RVs, existing entry systems usually are designed to occupy as little space as possible. Many times, this results in the entry being steep, such as in the case of stairs, and even vertical in the case of ladders. While the steep pitch of stairs or a vertical ladder can be difficult to traverse for some users, a shorter and steeper entry may be preferred by other users for a quicker ingress and egress.

SUMMARY

Deploying stepways for vehicles and methods of operating deploying stepways are disclosed herein. The deploying stepways include a step assembly comprising a plurality of steps and a step frame that is pivotally coupled to and supports the plurality of steps. The step frame includes a pivot assembly positioned along a length of the step frame, and the step assembly includes a proximal portion defined on one side of the pivot assembly and a distal portion defined on the other side of the pivot assembly. The deploying stepway also includes a guide frame configured to be secured to a vehicle and to selectively receive and support the step assembly. The deploying stepway is configured to be selectively transitioned among a plurality of stepway configurations that include a stair configuration in which the step assembly extends form the guide frame at a declined stair angle and in which the proximal portion and the distal portion of the step assembly are at least substantially aligned with one another, a ladder configuration in which the distal portion of the step assembly is pivoted about the pivot assembly relative to the proximal portion and extends from the guide frame at a declined stair angle, and a stowed configuration in which the proximal portion and the distal portion of the step assembly are at least substantially aligned with one another and in which at least a substantial portion of the step assembly is received in the guide frame.

The methods include deploying the deploying stepway from the stowed configuration to the step configuration and transitioning the deploying stepway from the stowed configuration to the ladder configuration.

BRIEF DESCRIPTION OF THE DRAWINGS

FIG. 15 is an elevation view illustrating an example of a vehicle comprising the example deploying stepway of FIG. 7 in the stowed configuration, according to the present disclosure.

FIG. 16 is an elevation view of the vehicle of FIG. 15 with the deploying stepway in the ladder configuration.

DETAILED DESCRIPTION

Figure 1:
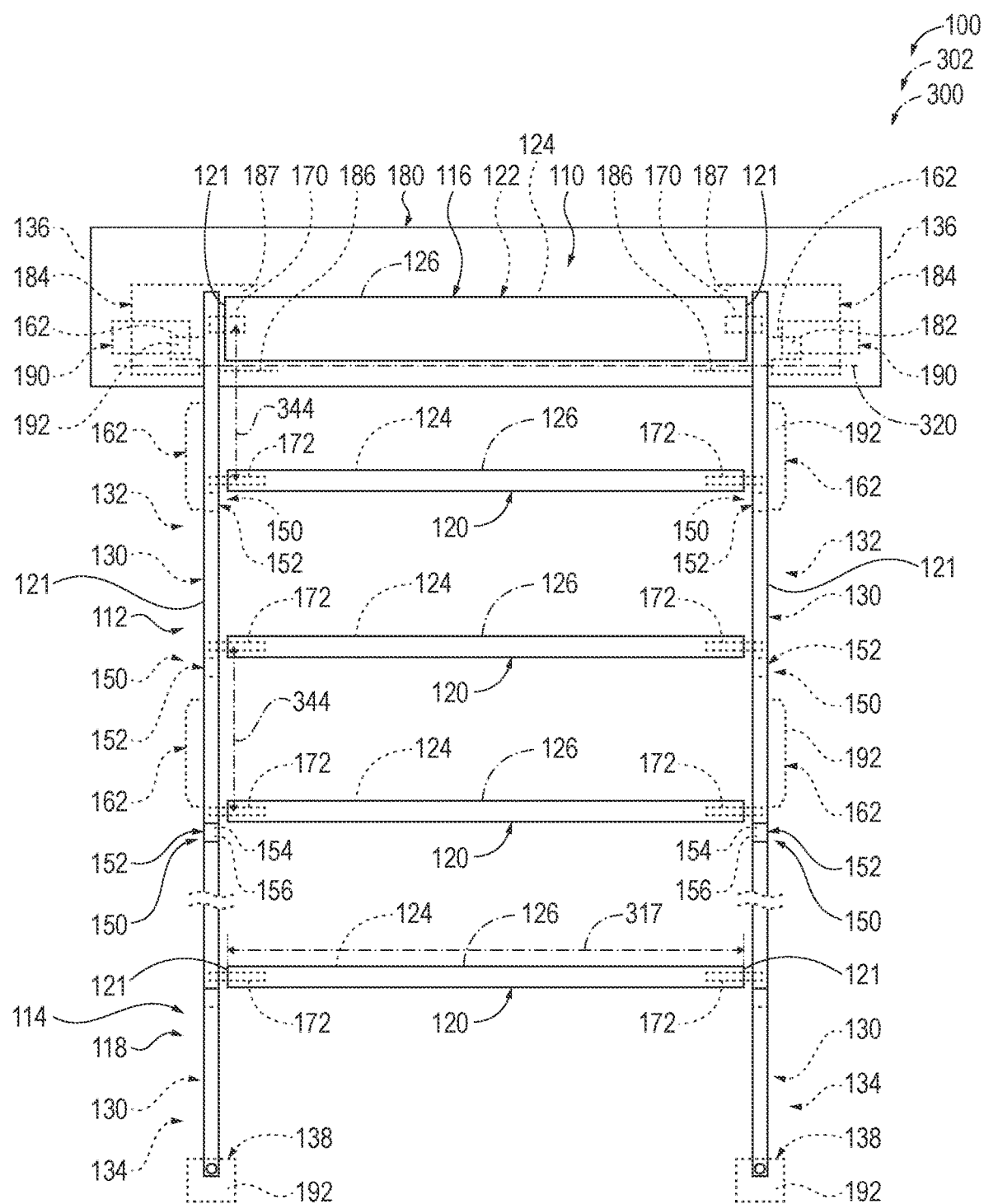
FIG. 1 is a schematic front elevation view illustrating examples of deploying stepways in a stair configuration, according to the present disclosure.

FIGS. 1-18 provide illustrative, non-exclusive examples of deploying stepways 100, vehicles 210 comprising deploying stepways 100, and methods 500 of operating the deploying stepways. In general in the drawings, elements that are likely to be included in a given example are illustrated in solid lines, while elements that are optional or alternatives may be illustrated in dashed lines. However, elements that are illustrated in solid lines are not essential to all examples of the present disclosure, and an element shown in solid lines may be omitted from a particular example without departing from the scope of the present disclosure. Dot-dashed lines are utilized to indicate various virtual features (e.g., dimensions, directions, etc.), and these virtual features may or may not be optional to the illustrated embodiment. Elements that serve a similar, or at least substantially similar, purpose are labelled with consistent numbers among the figures. Similarly, all elements may not be labelled in each of FIGS. 1-18, but reference numerals associated therewith may be utilized herein for consistency. Elements, components, and/or features that are discussed herein with reference to one or more of FIGS. 1-18 may be included in and/or utilized with any of FIGS. 1-18 without departing from the scope of the present disclosure.

Figure 2:
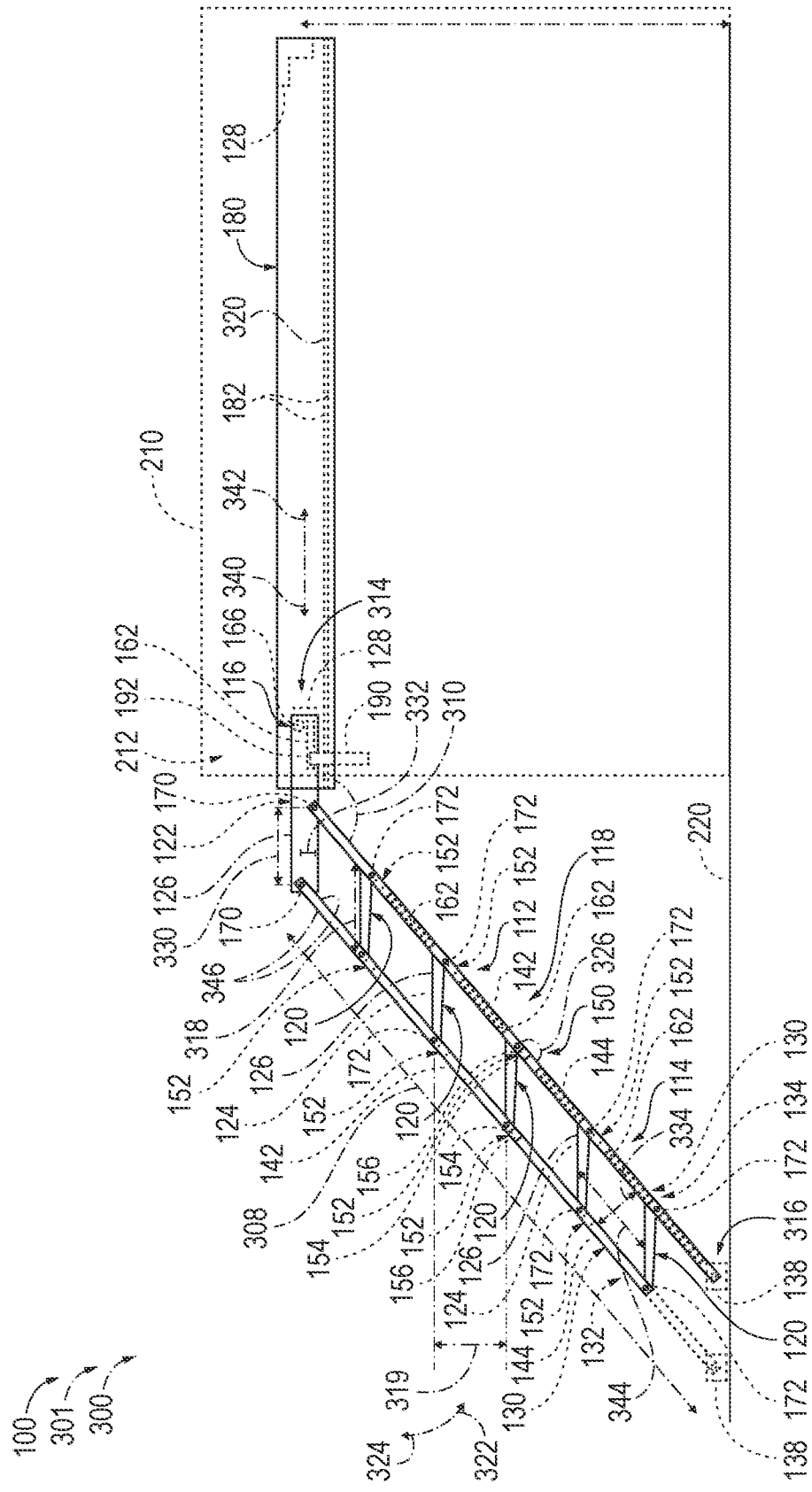
FIG. 2 is a schematic side elevation view illustrating examples of deploying stepways in the stair configuration, according to the present disclosure.
Figure 3:
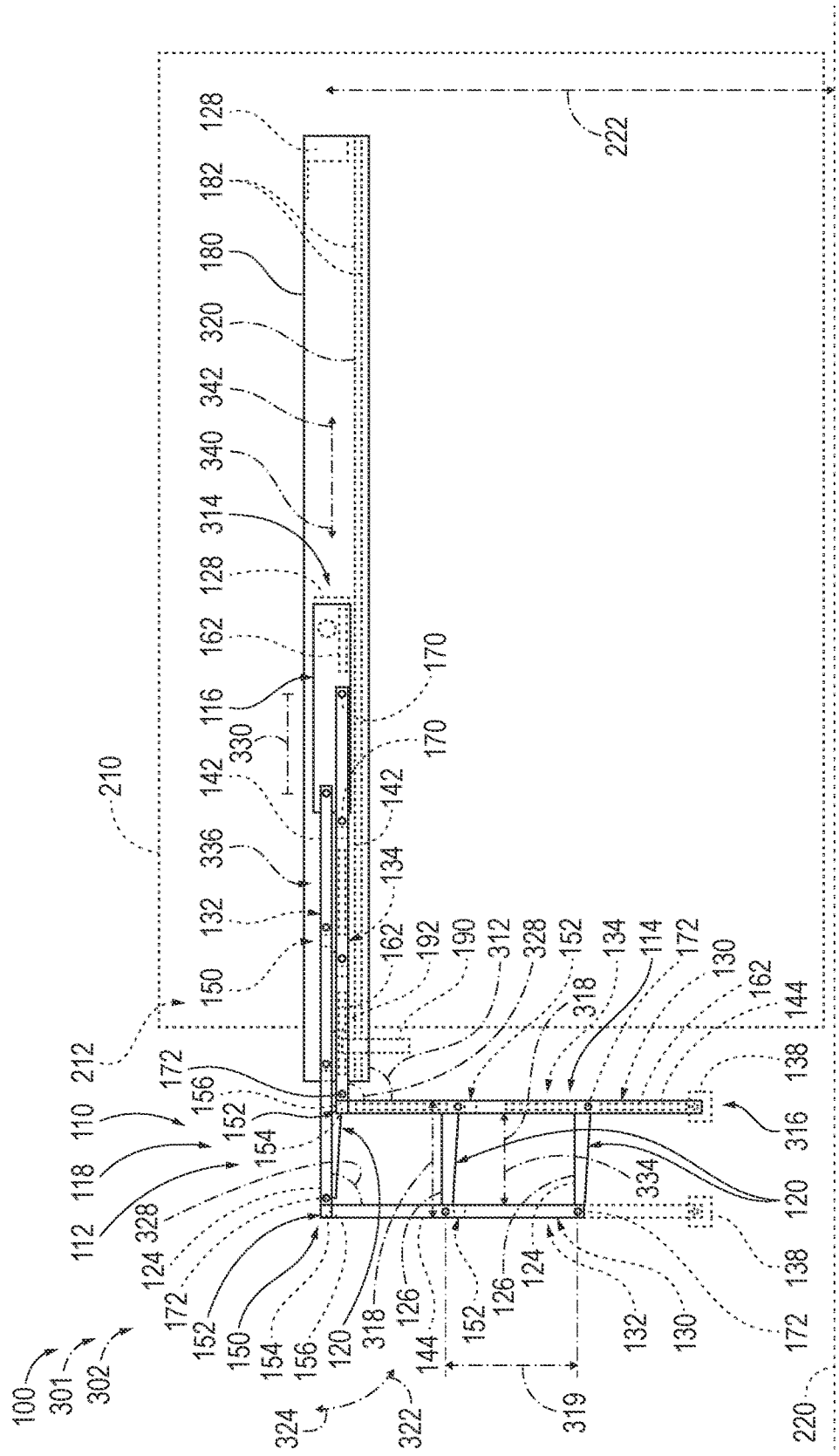
FIG. 3 is a schematic side elevation view illustrating examples of deploying stepways in a ladder configuration, according to the present disclosure.
Figure 4:
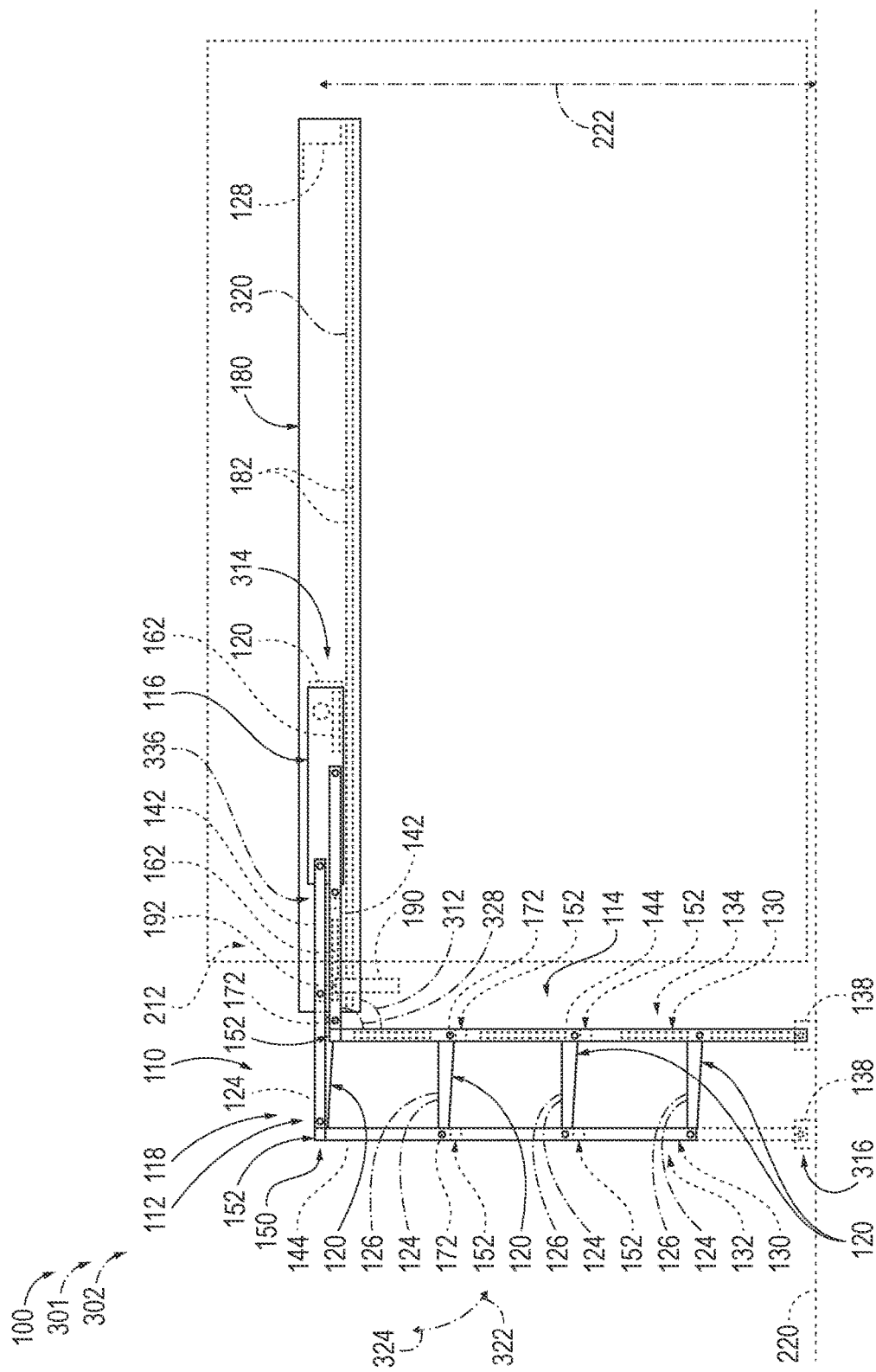
FIG. 4 is a schematic side elevation view illustrating examples of deploying stepways in another ladder configuration, according to the present disclosure.
Figure 5:
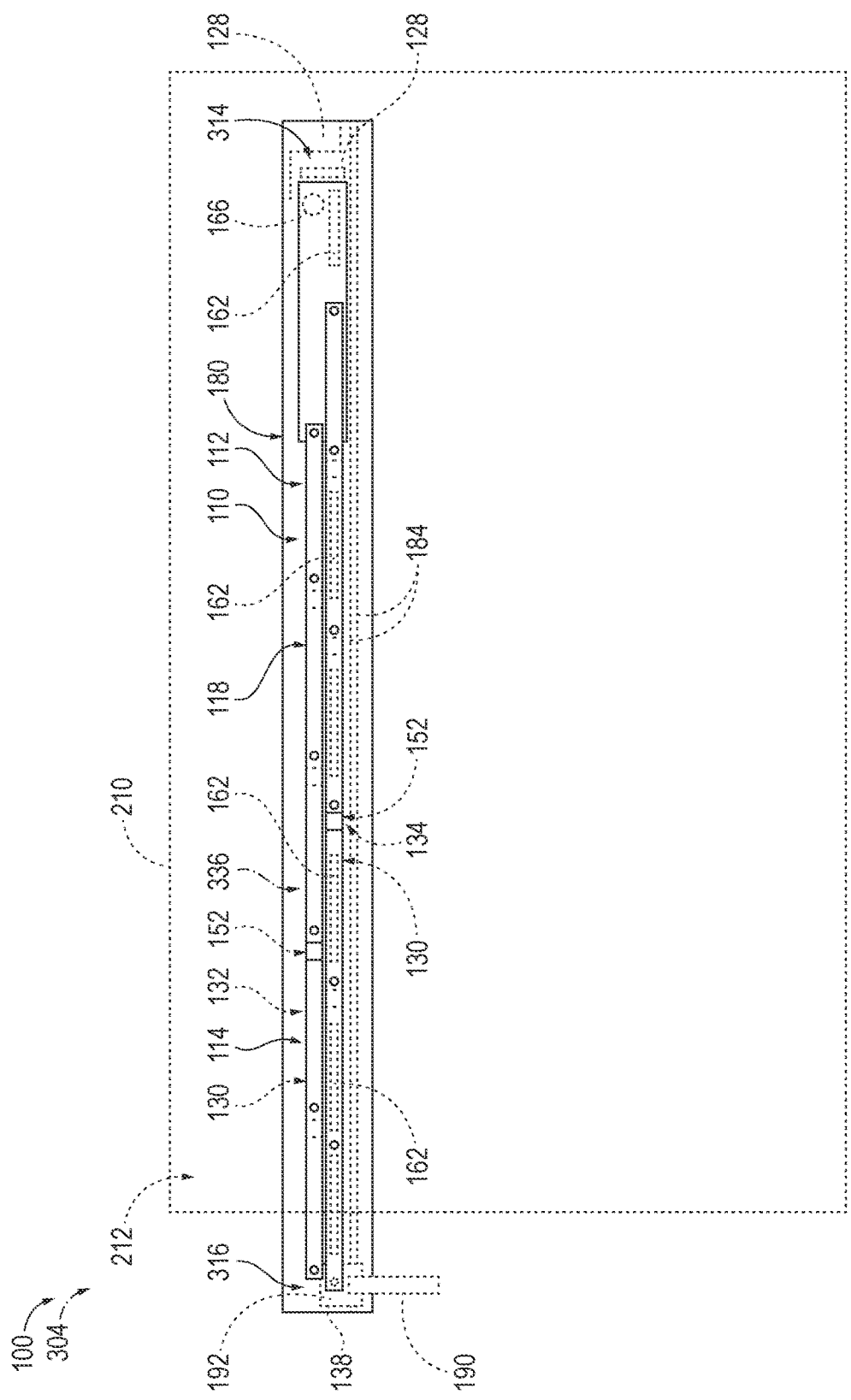
FIG. 5 is a schematic side elevation view illustrating examples of deploying stepways in a stowed configuration, according to the present disclosure.
Figure 6:
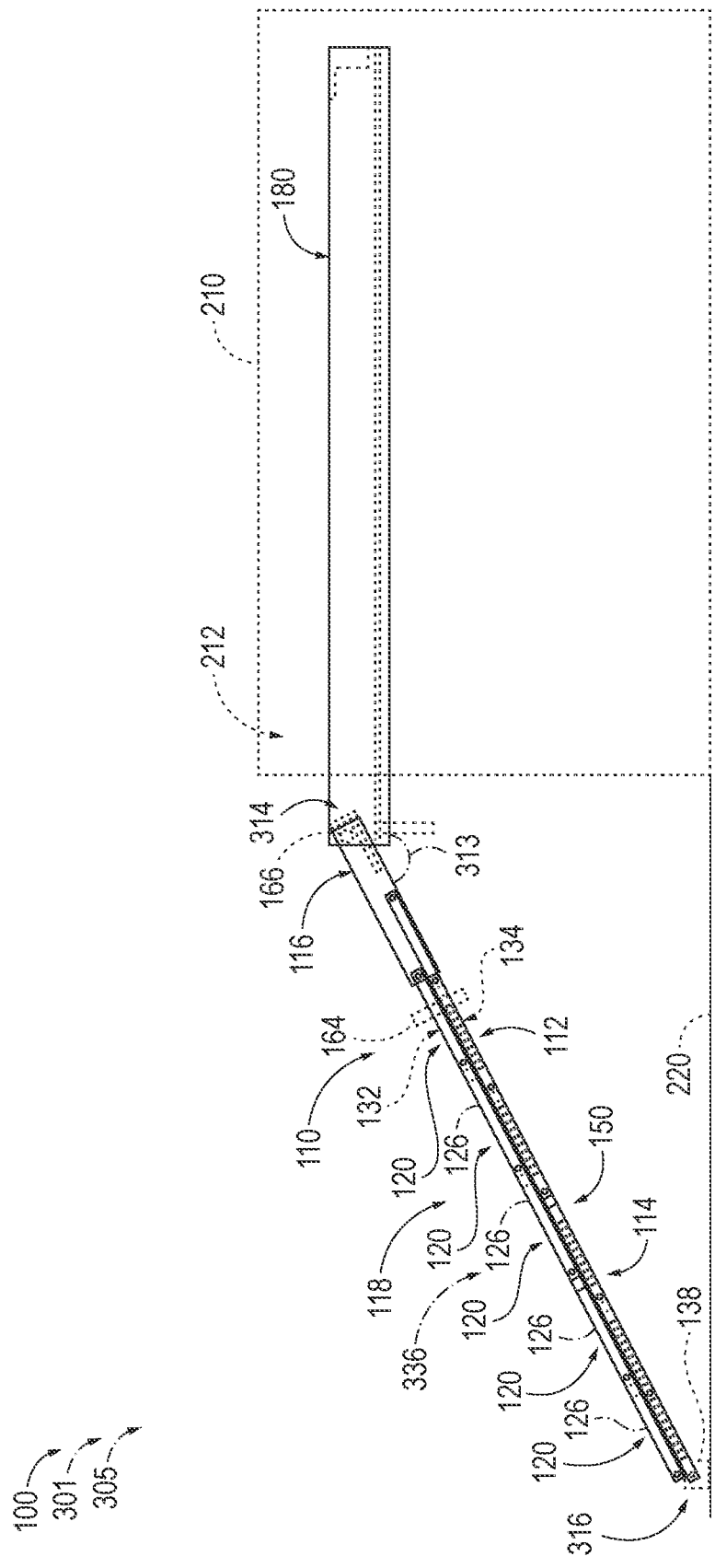
FIG. 6 is a schematic side elevation view illustrating examples of deploying stepways in an optional ramp configuration, according to the present disclosure.

With initial reference to the schematic representations provided in FIGS. 1-6, FIG. 1 is a schematic front elevation view representing various examples of deploying stepways 100, and FIGS. 2-6 are schematic side elevation views representing various examples of deploying stepways 100. Specifically, FIGS. 1-2 illustrate examples of deploying stepways 100 in a stair configuration 300, FIG. 3 illustrates examples of deploying stepways in a ladder configuration 302, FIG. 4 illustrates additional or alternative examples of deploying stepways in ladder configuration 302, FIG. 5 illustrates examples of deploying stepways in a stowed configuration 304, and FIG. 6 illustrates examples of deploying stepways 100 in an optional ramp configuration 305.

Generally with reference to FIGS. 1-5, deploying stepways 100 include a step assembly 110 having a plurality of steps 120 and a step frame 118 that is pivotally coupled to and that supports the plurality of steps 120. Step frame 118 comprises at least one pivot assembly 150 positioned along a step frame length 308 of step frame 118. Step frame 118 defines a proximal portion 112 on one side of pivot assembly 150 and a distal portion 114 on the other side of pivot assembly 150. Pivot assembly 150 is configured to permit distal portion 114 to selectively pivot relative to proximal portion 112 about pivot assembly 150. Deploying stepways 100 also includes a guide frame 180 that is configured to be secured to a vehicle 210 and to selectively receive and support step assembly 110.

Deploying stepway 100 is configured to be selectively transitioned among and/or comprises a plurality of stepway configurations. The stepway configurations include a stair configuration 300, schematically illustrated in FIGS. 1-2, a ladder configuration 302, schematically illustrated in FIGS. 3-4, and a stowed configuration 304, schematically illustrated in FIG. 5. As perhaps best seen in FIG. 1-2, when deploying stepway 100 is in stair configuration 300, proximal portion 112 and distal portion 114 of step assembly 110 are at least substantially aligned with one another and step assembly 110 extends from guide frame 180 at a declined stair angle 310 (FIG. 2). As perhaps best seen in FIGS. 3-4, when deploying stepway 100 is in ladder configuration 302, distal portion 114 of step assembly 110 is pivoted about pivot assembly 150 relative to proximal portion 112 of step assembly 110 and extends from guide frame 180 at a declined ladder angle 312. In other words, proximal portion 112 and distal portion 114 of step assembly 110 are not aligned with one another in ladder configuration 302, and at least some of proximal portion 112 may be received in guide frame 180. By contrast, at least a substantial portion of, and optionally the entirety of, proximal portion 112 of step assembly 110 may be deployed from, or positioned outside of, guide frame 180 in stair configuration 300. As perhaps best seen in FIG. 5, when deploying stepway 100 is in stowed configuration 304, proximal portion 112 and distal portion 114 are at least substantially aligned with one another and at least a substantial portion of, and optionally the entirety of, step assembly 110 is received within guide frame 180.

Deploying stepway 100 may be configured to transition among the plurality of stepway configurations in any suitable manner. In some examples, deploying stepway 100 is configured to be manually operated, for example, with a user (i.e., a person) engaging step assembly 110 to translate step assembly 110 to within and from within guide frame 180 and/or to pivot step assembly 110 and/or distal portion 114 thereof relative to guide frame 180. Additionally or alternatively, deploying stepway 100 may be at least partially automated or motorized. For example, deploying stepway 100 may include a drive mechanism that is configured to selectively translate step assembly 110 relative to guide frame 180, a stair pivot drive mechanism configured to selectively pivot step assembly 110 relative to guide frame 180, and/or a ladder pivot drive mechanism configured to selectively pivot distal portion 114 of step assembly 110 relative to proximal portion 112 of step assembly 110. In such examples, the drive mechanism, the stair pivot drive mechanism, and/or the ladder pivot drive mechanism each may be connected to and configured to receive power from a power source, such as a power source comprised in vehicle 210. In such examples, deploying stepway 100 further may include a controller configured to control operation of and/or control power delivery to the drive mechanism, the stair pivot drive mechanism, and/or the ladder pivot drive mechanism and a user input device configured to receive input from the user and issue corresponding commands to the controller.

For the sake of brevity, the present disclosure may refer to a particular component, collection of components, assembly, structure, etc. of deploying stepway 100 as having one or more specified functions, attributes, relationships, orientations, etc. in a given stepway configuration. However, this should be understood to mean, or have an equivalent meaning to, the particular component, collection of components, assembly, structure, etc. of deploying stepway 100 as having the one or more specified functions, attributes, relationships, orientations, etc. when deploying stepway 100 is in the given stepway configuration.

Ladder configuration 302 and stair configuration 300 each may be referred to as a deployed configuration 301. When step assembly 110 is in a deployed configuration 301, at least a portion of step assembly 110 extends from guide frame 180 at a declined angle relative to guide frame 180. Guide frame 180 may be mounted within or to vehicle 210 at an elevated position such that guide frame 180 is spaced above a ground surface 220 that supports or is adjacent to vehicle 210. As a more specific example, guide frame 180 may be mounted proximate to and beneath an elevated point of egress 212 on vehicle 210 such that deploying stepway 100 provides access to elevated point of egress 212 when deploying stepway 100 is in any deployed configuration 301.

Specifically, guide frame 180 may be mounted at a nominal height 222 within vehicle 210, which may correspond to a distance between guide frame 180 and ground surface 220. When deploying stepway 100 is in any deployed configuration 301, at least a portion of step assembly 110 may extend outwardly from guide frame 180 along a direction that has a component parallel to nominal height 222. In this way, at least a portion of step assembly 110 extends along nominal height 222 towards ground surface 220 to provide at least one, and optionally a series of, step(s) 120 along nominal height 222. When guide frame 180 is mounted proximate and/or beneath elevated point of egress 212, a user may utilize these step(s) 120 to traverse nominal height 222 for access to and exit from elevated point of egress 212. As discussed in more detail herein, step assembly 110 may be dimensioned such that a distal end 316 of step assembly 110 engages ground surface 220 when deploying stepway 100 is in stair configuration 300, and optionally when deploying stepway 100 is in ladder configuration 302.

More specifically, step assembly 110 may be described as having distal end 316, or a distal end region, that is positioned furthest from guide frame 180 and/or closest to ground surface 220 when step assembly 110 is in any deployed configuration 301, and a proximal end 314, or proximal end region, that is opposite to or positioned furthest from distal end 316 within step assembly 110. Accordingly, a first component of step assembly 110 may be referred to herein as being distal of, or in a distal direction of a second component when the first component is positioned closer to distal end 316 than the second component. Likewise, the second component may be referred to being proximal of, or in a proximal direction of the first component as it is positioned closer to proximal end 314 than the first component. For the same reasons, proximal portion 112 of step assembly 110 is positioned closer to proximal end 314 than distal portion 114 of step assembly 110, and distal portion 114 of step assembly 110 is positioned closer to distal end 316 than proximal portion 112 of step assembly 110. Distal portion 114 of step assembly 110 also may include or define distal end 316.

Step assembly 110 may be configured to translate to within guide frame 180 to transition deploying stepway 100 to stowed configuration 304 from any deployed configuration 301, and step assembly 110 may be configured to translate from within guide frame 180 to transition deploying stepway 100 from stowed configuration 304 to any deployed configuration 301. As discussed in more detail herein, guide frame 180 may be configured to guide translation of step assembly 110 to within and from within guide frame 180 in a specific or predefined manner. As shown in FIGS. 2-3, guide frame 180 may be configured to guide translation of step assembly 110 along a guide plane 320 within guide frame 180. More specifically, guide frame 180 may include a plurality of guide surfaces 182 that support step assembly 110 within guide frame 180 and that define guide plane 320. Guide plane 320 and/or guide surfaces 182 also may define the orientation of step assembly 110 in stowed configuration 304. Additionally or alternatively, guide plane 320 and/or guide surfaces 182 may define the orientation of a portion of step assembly 110 that is received in guide frame 180 in any deployed configuration 301.

Guide frame 180 also may be mounted within vehicle 210 to be level when vehicle 210 is supported on a level ground surface 220. In other words, guide frame 180 and/or guide plane 320 thereof may extend at least substantially parallel to ground surface 220 when vehicle 210 is supported on a level ground surface 220. Declined ladder angle 312 and/or declined stair angle 310 may be measured between step frame 118 and guide plane 320. Thus, in some examples, declined ladder angle 312 and/or declined stair angle 310 are measured between step frame 118 and a plane that is parallel to ground surface 220.

Deploying stepway 100 may be included in and/or utilized with any suitable type of vehicle 210. Examples of suitable types of vehicles include land vehicles, water vehicles, boats, aircraft, planes, and helicopters. More specific examples of land vehicles include trains, cars, trucks, semi-trucks, busses, trailers, vans, campers, and recreational vehicles (RVs). Deploying stepway 100 also may be configured to provide access to any suitable elevated point of egress 212 comprised in vehicle 210, with examples of elevated points of egress 212 including an elevated door on vehicle 210, a car door, a back-end door, a truck door, a cab door, a rear trailer door, a door to an enclosed living space in vehicle 210, an RV door, an elevated deck, an elevated bed, a truck bed, a trailer bed, a cabin door, and the like.

With specific reference to FIG. 2, step frame length 308 of step frame 118 may be selected based at least in part upon the nominal height 222 at which guide frame 180 is mounted within vehicle 210 and a desired declined stair angle 310. Typically, step frame length 308 is selected to be greater than nominal height 222 such that distal end 316 of step assembly 110 may be positioned to engage ground surface 220 when deploying stepway 100 is in stair configuration 300 and step assembly 110 is oriented at declined stair angle 310 relative to step frame 180. More specific examples of suitable declined stair angles 310 include at least 100°, at least 110°, at least 120°, at least 125°, at least 130°, at least 135°, at least 140°, at least 145°, at least 150°, at least 160°, at most 120°, at most 125°, at most 130°, at most 135°, at most 145°, at most 150°, at most 160°, and/or at most 165°. In some examples, step frame length 308 is selected to be a threshold fraction of nominal height 222. As more specific examples, step frame length 308 may be selected to be at least 105%, at least 110%, at least 120%, at least 125%, at least 130%, at least 135%, at least 140%, at least 145%, at least 150%, at least 160%, at least 180%, at least 200%, at most 125%, at most 130%, at most 135%, at most 140%, at most 145%, at most 150%, at most 160%, at most 180%, at most 200%, at most 300%, and/or at most 400% of nominal height 222.

As perhaps best seen in FIGS. 3-4, when deploying stepway 100 is in ladder configuration 302, proximal portion 112 of step assembly 110 may extend at least substantially parallel to guide plane 320 and/or may not extend towards ground surface 220. In such examples, only a portion of step frame length 308 that is along distal portion 114 extends in a direction that has a component along or parallel to nominal height 222. Stated in more general terms, in ladder configuration 302 only a portion of step assembly 110 is deployed to provide steps 120 leading along nominal height 222. As such, in some examples, declined ladder angle 312 is selected to be less than declined stair angle 310. Specifically, utilizing a smaller declined ladder angle 312 results in a steeper step pitch along step assembly 110, but also permits step assembly 110 to provide steps 120 along a larger portion of nominal height 222 than if declined ladder angle 312 were selected to be the same as declined stair angle 310.

A user may select between utilizing deploying stepway 100 in ladder configuration 302 or in stair configuration 300, depending on the particular situation. For example, ladder configuration 302 may be selected for quick ingress or egress to elevated point of egress 212 for examples in which ground surface 220 directly beneath elevated point of egress 212 is firm or traversable, and/or for examples in which clearance or area around vehicle 210 is limited. Additionally or alternatively, stair configuration 300 may be selected when a shallower step pitch is desired (e.g., for users that would struggle with ladder configuration 302) and/or for examples in which the ground surface 220 directly beneath elevated point of egress 212 is treacherous (e.g., wet, muddy, etc.) or not traversable.

More specific examples of suitable declined ladder angles 312 include 90°, at least 60°, at least 70°, at least 80°, at least 90°, at least 95°, at least 100°, at least 110°, at most 90°, at most 95°, at most 100°, at most 110°, at most 115°, at most 120°, and/or at most 130°. As shown in the sequence between FIGS. 3 and 4, step assembly 110 may or may not be configured to contact ground surface 220 in ladder configuration 302. For examples in which step assembly 110 is not configured to contact ground surface 220 in ladder configuration 302 (as shown in FIG. 3), step assembly 110 may be described as having a suspended, boom, hanging, or free-floating configuration, and deploying stepway 100 is configured to support at least the entire weight of a user on step assembly 110. In other words, deploying stepway 100 may be configured to maintain step assembly 110 at declined ladder angle 312, with at least the entire weight of a user supported on step assembly 110 and with step assembly 110 oriented at declined ladder angle 312.

A separation between distal end 316 of step assembly 110 and ground surface 220 when deploying stepway 100 is in ladder configuration 302 may be determined, at least in part, by the location of pivot assembly 150 along step frame length 308. Specifically, positioning pivot assembly 150 nearer to distal end 316 of step assembly 110 will produce a shorter distal portion 114 and vice versa for positioning pivot assembly 150 further from distal end 316. Distal end 316 of step assembly 110 may be spaced above ground surface 220 in ladder configuration 302 for examples in which the length of distal portion 114 is less than nominal height 222. In some examples, distal portion 114 of step assembly 110 is dimensioned such that distal end 316 of step assembly 110 is positioned at a separation from ground surface 220 that is a threshold fraction of nominal height 222, with examples of this threshold fraction including 0%, at least 5%, at least 10%, at least 15%, at least 20%, at least 25%, at most 5%, at most 10%, at most 15%, at most 20%, at most 25%, at most 30%, at most 40%, and/or at most 50%.

Pivot assembly 150 operatively couples distal portion 114 and proximal portion 112 of step assembly 110 to one another. In other words, proximal portion 112 and distal portion 114 of step assembly 100 are pivotally coupled to one another by pivot assembly 150. As perhaps best seen in FIGS. 3 and 4, distal portion 114 of step assembly 100 pivots about pivot assembly 150 in a first direction 322 relative to proximal portion 112 of step assembly 110 when deploying stepway 100 is transitioned towards ladder configuration 302 from stowed configuration 304. In other words, distal portion 114 may pivot in first direction 322 towards declined ladder angle 312 from alignment with proximal portion 112. Similarly, distal portion 114 may pivot in a second direction 324 that is opposite to first direction 322 when deploying stepway 100 is transitioned towards stowed configuration 304 from ladder configuration 302 and/or when distal portion 114 is pivoted towards alignment with proximal portion 112 from declined ladder angle 312.

In some examples, pivot assembly 150 is configured to restrict pivotal movement of distal portion 114 relative to proximal portion 112 to within a selected range. As discussed in more detail herein, pivot assembly 150 may include one or more pivot restrictors 154 that are configured to restrict pivotal movement of distal portion 114 relative to proximal portion 112 to within the selected range. More specifically, pivot assembly 150 may be configured to permit distal portion 114 of step assembly 110 to pivot in second direction 324 towards alignment with proximal portion 112 of step assembly 110 and to restrict distal portion 114 from pivoting beyond alignment with proximal portion 112 in second direction 324. For example, as best seen in FIG. 2, the weight of a user on steps 120 urges distal portion 114 to pivot in second direction 324 beyond alignment with proximal portion 112. In such examples, pivot assembly 150 may be configured to maintain proximal portion 112 and distal portion 114 in alignment with one another against the weight of the user by restricting pivotal movement of proximal portion 112 and distal portion 114. In some examples, pivot assembly 150 is configured to restrict distal portion 114 of step assembly 110 from pivoting in second direction 324 beyond a threshold alignment angle 326 relative to proximal portion 112. As examples, the threshold alignment angle 326 may be 180 degrees (°), at least 160°, at least 170°, at least 175°, at least 180°, at most 180°, at most 182°, at most 185°, and/or at most 190°.

Referring specifically to FIGS. 3 and 4, pivot assembly 150 additionally or alternatively may be configured to restrict distal portion 114 of step assembly 110 from pivoting in the first direction 322 beyond, or to less than, a threshold ladder angle 328 relative to proximal portion 112, with examples of the threshold ladder angle 328 including 90°, at least 60°, at least 70°, at least 80°, at least 90°, at least 95°, at least 100°, at least 110°, at most 90°, at most 95°, at most 100°, at most 110°, at most 115°, at most 120°, and/or at most 130°. Stated another way, when deploying stepway 100 is in ladder configuration 302, pivot assembly 150 may be configured to maintain distal portion 114 at declined ladder angle 312, such as against the weight of a user on steps 120. In some examples, pivot assembly 150 is configured to restrict pivotal movement of distal portion 114 relative to proximal portion 112 to between threshold alignment angle 326 and threshold ladder angle 328.

In some examples, pivot assembly 150 includes at least one, and optionally a plurality of, pivot locking mechanisms 156. Pivot locking mechanisms 156 may be configured to selectively lock distal portion 114 at a selected angle relative to proximal portion 112, for example, an angle between and/or including threshold alignment angle 326 and threshold ladder angle 328. When pivot locking mechanism 156 is engaged, distal portion 114 may be restricted from pivoting in both first direction 322 and second direction 324 relative to proximal portion 112. Pivot locking mechanisms 156 may be configured to provide reinforcement to pivot restrictors 154. Additionally or alternatively, pivot locking mechanisms 156 may be configured to prevent distal portion 114 from moving in a direction permitted by pivot restrictors 154 until pivot locking mechanisms 156 are disengaged. Examples of suitable pivot locking mechanisms include a latch, a detent, a catch, a pin and bore, and/or a cog and pawl.

As shown in FIGS. 1-4, in some examples, step assembly 110 includes a plurality of pivot assemblies 150 spaced apart from one another along step frame length 308. As examples, step assembly 110 my include at least two, at least three, at least four, at least five, at most three, at most four, at most five, and/or at most six pivot assemblies 150. In some examples, step assembly 110 includes a pivot assembly 150 proximate at least some, and optionally each, step 120. Each pivot assembly 150 may be described as separating step assembly 110 into a respective proximal portion 112 and a respective distal portion 114, with the length of distal portion 114 and proximal portion 112 defined by each pivot assembly 150 being different from the length of distal portion 114 and proximal portion 112 defined by another pivot assembly 150. The respective proximal portion 112 or the respective distal portion 114 defined by each pivot assembly 150 may overlap with or be positioned entirely within a respective proximal portion 112 or a respective distal portion 114 defined by another pivot assembly 150.

Utilizing a plurality of pivot assemblies 150 may permit the length of distal portion 114 that extends from guide frame 180 in ladder configuration 302 to be selectively adjusted. In other words, deploying stepway 100 may be described as having a plurality of ladder configurations 302 for examples in which step assembly 110 comprises a plurality of pivot assemblies 150. For example, step assembly 110 may include a first pivot assembly 150 defining a respective distal portion 114 having a first length, and a second pivot assembly 150 defining a respective distal portion 114 having a second length that is less than the first length. In such an example, a user may select between utilizing the first or the second pivot assembly 150 in ladder configuration 302 to adjust a distance between distal end 316 of step assembly 110 and ground surface 220 and/or to adjust a number of steps 120 available in ladder configuration 302.

For examples in which the first pivot assembly 150 is selected, the second pivot assembly 150 is positioned outside of guide frame 180 in the ladder configuration 302 corresponding to the first pivot assembly 150, and the second pivot assembly 150 is included in the distal portion 114 of the step assembly 110, defined by the first pivot assembly 150. Conversely, for examples in which the second pivot assembly 150 is selected, the first pivot assembly 150 is positioned within guide frame 180 in the ladder configuration 302 corresponding to the second pivot assembly 150, and the first pivot assembly 150 is included in the proximal portion 112 of the step assembly 110, defined by the second pivot assembly 150.

With continued reference to FIGS. 1-5, step assembly 110 may include any suitable number of steps 120. As examples, step assembly 110 may include at least two, at least three, at least four, at least five, at least six, at least seven, at least eight, at least ten, at most three, at most four, at most five, at most six, at most seven, at most eight, at most ten, and/or at most twenty steps 120. At least one step 120 may be included in distal portion 114 of step assembly 110 and at least one step 120 may be included in proximal portion 112 of step assembly 110. Each step 120 may be pivotally coupled to step frame 118 by a plurality of step pivot connections 172. Examples of suitable step pivot connections 172 include pin connections, axle-bushing connections, and/or axle-bearing connections.

Each step 120 may include a tread 124 that may define an upper surface or region of each step 120 and that a user may walk on when ascending or descending deploying stepway 100. Each step 120 also may define a tread plane 126 that is defined along tread 124, ignoring or averaging across any protruding traction features disposed along tread 124. Step frame 118 may be configured to support each step 120 with the tread plane 126 of each step 120 at least substantially parallel to guide plane 320 when deploying stepway 100 is in any of stair configuration 300, ladder configuration 302, and stowed configuration 304. Step frame 118 also may be configured to support each step 120 in this orientation when deploying stepway 100 is transitioned between stowed configuration 304 and ladder configuration 302 or stowed configuration 304 and stair configuration 300. More specifically, steps 120 may be configured to pivot about step pivot connections 172 relative to step frame 118 to maintain this orientation as step frame 118, or a portion thereof, is pivoted towards and away from a declined angle relative to guide plane 320.

With continued reference to FIGS. 1-5, step assembly 110 further may include a carriage 116 that is at least partially received within guide frame 180 in stair configuration 300, ladder configuration 302, and stowed configuration 304. In other words, at least a portion of carriage 116 may remain within and optionally engage guide frame 180 in each of the stepway configurations. In some examples, carriage 116 defines proximal end 314 of step assembly 110. For examples in which step assembly 110 includes carriage 116, a proximal end of step frame 118 may be pivotally coupled to carriage 116, and step frame 118 is configured to pivot relative to carriage 116 when deploying stepway 100 transitions between stowed configuration 304 and stair configuration 300. Carriage 116 also may include a landing step 122 that may define an upper surface of carriage 116 and that may be positioned higher than, or above, each step 120 in stair configuration 300 and/or at least all but one of the steps 120 that extend outside of guide frame 180 in ladder configuration 302.

As shown in FIG. 2, when deploying stepway 100 is in stair configuration 300, carriage 116 may protrude from guide frame 180 to position the proximal end of step frame 118 exterior to guide frame 180 and/or vehicle 210 and permit step frame 118 to be oriented at declined stair angle 310 without obstruction from guide frame 180 and/or vehicle 210. In this position, carriage 116, or tread plane 126 defined by landing step 122, may extend substantially parallel to guide plane 320. Step frame 118 may be pivotally coupled to carriage 116 in any suitable manner. For example, step assembly 110 may include a plurality of pivot connections 170 that pivotally couple step frame 118 to carriage 116. Pivot connections 170 may permit step frame 118 to pivot relative to carriage 116 along a predefined path or along a predefined plane, and pivot connections 170 may be configured to restrict relative motion between carriage 116 and step frame 118 outside of the predefined path or the predefined plane. For example, the pre-defined plane may be at least substantially parallel to step frame length 308 and normal to guide plane 320. Examples of suitable pivot connections 170 include pin connections, axle-bushing connections, and/or axle-bearing connections.

With continued reference to FIGS. 1-5, step frame 118 may include a set of support rails 130 having a pair of lead support rails 132 and a pair of back support rails 134. Each support rail 130 of the set of support rails is pivotally coupled to carriage 116 and each step 120. In other words, carriage 116 and steps 120 pivotally couple pair of lead support rails 132 to pair of back support rails 134. For example, each support rail 130 may be pivotally coupled at its proximal end or proximal end region to carriage 116 by a respective pivot connection 170 and to the plurality of steps 120 by a respective plurality of step pivot connections 172.

Each step 120 defines a step width 317 and a run length 318 that is measured perpendicular to step width 317. Run length 318 additionally or alternatively may be referred to as the tread depth. Run length 318 is measured between a forward or toe edge of step 120 and a back edge of step 120 that is opposed to the toe edge. Step width 317 is measured between lateral sides 121 of step 120. Step width 317 is shown in the schematic front elevation view of FIG. 1, whereas run length 318 is shown in the schematic side elevation views of FIGS. 2-3.

As shown in FIG. 1, the support rails 130 of a given pair of support rails 130 (e.g. the support rails 130 of the pair of lead support rails 132) may be operatively coupled to the lateral sides 121 of each step 120 and/or spaced apart from one another by, or approximately by, step width 317. Likewise, the support rails 130 of a given pair may be operatively coupled to lateral sides 121 of carriage 116, optionally spaced apart by, or approximately by, step width 317. As shown in FIGS. 2-4, pair of lead support rails 132 are pivotally coupled to each step 120 and to carriage 116, spaced apart from and forward of back support rails 134. As utilized herein, "spaced forward of" refers to spaced in a forward direction 340 of, where forward direction 340 corresponds to a direction that step assembly 110 translates along guide plane 320 out from guide frame 180. In other words, forward direction 340 is outward from guide frame 180 and parallel to guide plane 320. Similarly, a rear direction 342, as utilized herein, is opposite to forward direction 340 and corresponds to a direction that step assembly 110 translates along guide plane 320, into guide frame 180. Accordingly, pair of lead support rails 132 may be coupled closer to the toe edge of each step 120, and pair of back support rails 134 are coupled closer to the back edge of each step 120.

The support rails 130 of a given pair may extend parallel to, or at least substantially parallel to, one another in each of the deploying stepway configurations. Pair of lead support rails 132 also may extend parallel to, or at least substantially parallel to, pair of back support rails 134 in stowed configuration 304 and in stair configuration 300, and portions of pair of lead support rails 132 may extend parallel to, or at least substantially parallel to, corresponding portions of pair of back support rails 134 in ladder configuration 302. More specifically, support rails 130 of a given pair may be coupled to each step 120 and to carriage 116 with an equivalent spacing therebetween. The pivot axes of the pivot connections 170 that couple pair of lead support rails 132 to carriage 116 may be aligned or coaxial, and the pivot axes of the step pivot connections 172 that couple pair of lead support rails 132 to each step 120 may be aligned or coaxial. Likewise, the pivot axes of the pivot connections 170 that couple pair of back support rails 134 to carriage 116 may be aligned or coaxial, and the pivot axes of the step pivot connections 172 that couple pair of back support rails 134 to each step 120 may be aligned or coaxial.

As shown in FIG. 2, the pivot axes of pivot connections 170 that couple pair of lead support rails 132 to carriage 116 may be parallel to and spaced forward of the pivot axes of pivot connections 170 that couple pair of back support rails 134 to carriage 116 by a horizontal rail offset 330. In other words, pair of lead support rails 132 may be pivotally coupled to carriage 116 spaced forward of pair of back support rails 134 by horizontal rail offset 330. In some examples, the pivot axes of step pivot connections 172 that couple pair of lead support rails 132 to each step 120 are parallel to and spaced forward of the pivot axes of the step pivot connections 172 that couple pair of back support rails 134 to each corresponding step 120 by horizontal rail offset 330. In this way, support rails 130, carriage 116, and any given step 120 may be described as defining a parallelepiped prism, with pivot connections 170 forming the four upper corners of the prism and the four step pivot connections 172 forming the four lower corners of the prism. The length of each side of the parallelepiped prism may remain at least substantially the same as deploying stepway 100 transitions among the plurality of stepway configurations.

As step frame 118 is pivoted relative to carriage 116 or guide plane 320, the orientation of steps 120 may be maintained, and steps 120 may cause pair of lead support rails 132 to move and pivot in tandem with pair of back support rails 134. When step frame 118 is pivoted about carriage 116 in first direction 322 away from alignment with guide plane 320 and towards declined stair angle 310, the parallelepiped prism transitions towards a rectangular cuboid shape, which corresponds to an increase in a step height 319 and each step 120 moving in rear direction 342. As utilized herein, step height 319 is measured between the treads 124 of adjacent steps 120 parallel to nominal height 222. Conversely, when step frame 118 is pivoted in second direction 324 towards alignment with guide plane 320 and away from declined stair angle 310, the parallelepiped prism transitions towards an increasingly oblique shape, which results in a decrease in step height 319 and each step 120 moving in the forward direction 340.

As shown in FIG. 2, pair of lead support rails 132 and pair of back support rails 134 are separated from one another by a rail spacing 334, which is defined herein as a shortest distance between a support rail 130 of pair of lead support rails 132 and a corresponding (i.e., on the same lateral side 121) support rail 130 of pair of back support rails 134. Rail spacing 334 between pair of lead support rails 132 and pair of back support rails 134 may be adjusted as deploying stepway 100 is transitioned between stowed configuration 304 and stair configuration 300. More specifically, rail spacing 334 may increase as step frame 118 is pivoted in first direction 322 towards declined stair angle 310 from being parallel to guide plane 320, and rail spacing 334 may decrease as step frame 118 is pivoted in second direction 324 away from declined stair angle 310. The space or volume occupied by step assembly 110 may decrease as rail spacing 334 is reduced and/or as step frame 118 is pivoted in second direction 324 away from declined stair angle 310.

In some examples, pair of lead support rails 132 and pair of back support rails 134 are positioned at a minimum rail spacing 334 when step frame 118 extends parallel to, or at least substantially parallel to, carriage 116 and/or guide frame 180. Step assembly 110 may be described as having a condensed configuration 336 in which pair of lead support rails 132 and pair of back support rails 134 are positioned at the minimum rail spacing 334. Condensed configuration 336 additionally or alternatively may be described as pair of lead support rails 132 and pair of back support rails 134 extending parallel to, or at least substantially parallel to, tread planes 126.

In some examples, guide frame 180 is configured or dimensioned such that step assembly 110 can be translated into and out of guide frame 180 when, and optionally only when, step assembly 110 is in condensed configuration 336. As discussed in more detail herein, pivot assembly 150 may permit proximal portion 112 of step assembly 110 to be in condensed configuration 336 and distal portion 114 of step assembly 110 to be pivoted away from condensed configuration 336. In this way, when deploying stepway 100 is in ladder configuration 302, proximal portion 112 of step assembly 110 may be in condensed configuration 336 and received in guide frame 180, while distal portion 114 of step assembly 110 protrudes from guide frame 180 pivoted away from condensed configuration 336.

As perhaps best seen in FIG. 2, steps 120 may be coupled to support rails 130 with a step spacing 344 between adjacent steps 120. Step spacing 344 may be measured between corresponding step pivot connections 172 (i.e., step pivot connections 172 to the same support rail 130) of adjacent steps 120. An uppermost step 120 of step assembly 110 also may be coupled to support rail 130 with step spacing 344 from carriage 116, with this step spacing 344 being measured between step pivot connection 172 of the upper most step 120 and pivot connection 170 that couples the corresponding support rail 130 to carriage 116. Step assembly 110 may be configured such that step spacings 344 are at least substantially uniform or such that each step spacing 344 is at least substantially equal to each other step spacing 344. In some examples, step spacing 344 is selected to be equal to or greater than run length 318. In this way, steps 120 may be positioned in an end-to-end relationship and/or may not overlap with one another when step assembly 110 is in condensed configuration 336.

As also shown in FIG. 2, in some examples, pair of lead support rails 132 are coupled to carriage 116 above pair of back support rails 134 by a vertical rail offset 332. As referred to herein, vertical rail offset 332 is measured between pivot connections 170 and normal to guide plane 320 and/or normal to horizontal rail offset 330. In some examples, vertical offset 332 is equal to or greater than a thickness 346 of a support rail 130. Coupling pair of lead support rails 132 to carriage 116 with vertical rail offset 332 from pair of back support rails 134 may permit pair of lead support rails 132 and pair of back support rails 134 to nest and/or extend parallel to one another in condensed configuration 336, with pair of lead support rails 132 being positioned above pair of back support rails 134. In other words, vertical rail offset 332 may prevent pair of back support rails 134 and pair of lead support rails 132 from abutting as step frame 118 is pivoted towards being parallel with guide plane 320. Similarly, step pivot connections 172 that couple each step 120 to pair of lead support rails 132 may be spaced above step pivot connections 172 that couple each step 120 to pair of back support rails 134 by vertical rail offset 332.

With continued reference to FIGS. 1-5, each support rail 130 may include a pivot mechanism 152 that separates each support rail 130 into a proximal rail portion 142 and a distal rail portion 144 and that permits distal rail portion 144 to selectively pivot relative to proximal rail portion 142. In other words, pivot mechanism 152 pivotally couples proximal rail portion 142 to distal rail portion 144. In some examples, proximal rail portions 142 of support rails 130 are of equivalent length. Pivot mechanisms 152 of support rails 130 may collectively form pivot assembly 150 of step frame 118. Specifically, pivot mechanism 152 of pivot assembly 150 may be disposed along a common region of step frame 118, such as adjacent to and optionally distal of a common step 120. Accordingly, proximal rail portions 142 are comprised in proximal portion 112 of step assembly 110, and distal rail portions 144 are comprised in distal portion 114 of step assembly 110.

Each pivot mechanism 152 defines a pivot axis about which pivot mechanism 152 permits distal rail portion 144 to pivot relative to proximal rail portion 142. In some examples, the pivot axes of pivot mechanisms 152 of pair of back support rails 134 are aligned or coaxial with one another, and pivot mechanisms 152 of pair of lead support rails 132 are aligned or coaxial with one another. In some examples, pivot mechanisms 152 of pair of lead support rails 132 are offset in the distal direction of pivot mechanisms 152 of pair of back support rails 134.

Specifically, as best seen in FIGS. 3 and 4, when deploying stepway 100 is in ladder configuration 302, proximal portion 112 of step assembly 110 may be in condensed configuration 336 with proximal rail portions 142 of pair of lead support rails 132 and pair of back support rails 134 positioned at the minimum rail spacing from one another and extending at least substantially parallel to guide plane 320. The horizontal rail offset 330 between pivot connections 170 causes pivot mechanisms 152 of pair of lead support rails 132 to be positioned in forward direction 340 of pivot mechanisms 152 of pair of back support rails 134. Each distal rail portion 144 is pivoted about pivot mechanism 152 in first direction 322 away from alignment with proximal rail portion 142 and optionally to threshold ladder angle 328. The offset between pivot mechanisms 152 of pair of lead support rails 132 and pivot mechanisms 152 of pair of back support rails 134 causes distal rail portions 144 of pair of lead support rails 132 to be positioned in forward direction 340 of distal rail portions 144 of pair of back support rails 134. Accordingly, distal rail portions 144 of pair of lead support rails 132 are spaced forward of distal rail portions 144 of pair of back support rails 134 to provide area for steps 120. Pivot mechanisms 152 may be positioned adjacent to, and distal of, a step 120, such that this step 120 forms the topmost or landing step 122 in ladder configuration 302.

In a similar manner to that discussed herein, with respect to pivot connections 170 and stair configuration 300, steps 120 may cause distal rail portions 144 of pair of lead support rails 132 to pivot in tandem with distal rail portions 144 of pair of back support rails 134. Accordingly, distal rail portions 144 of support rails 130 may extend at least substantially parallel to one another in ladder configuration 302. The rail spacing 334 between distal rail portions 144 and step height 319 decrease as deploying stepway 100 is transitioned from ladder configuration 302 towards stowed configuration 304. Similarly, rail spacing 334 between distal rail portions 144 and step height 319 increases as deploying stepway 100 is transitioned from stowed configuration 304 to ladder configuration 302. For examples in which declined ladder angle 312 is less than declined stair angle 310, rail spacing 334 and step height 319 are greater in ladder configuration 302 than in stair configuration 300.

For examples in which step assembly 110 comprises a plurality of pivot assemblies 150, each pivot assembly 150 may include a respective set of pivot mechanisms 152 that may operate in a similar, or at least substantially similar manner, to that discussed herein with respect to a single pivot assembly 150.

As perhaps best seen in FIG. 2, pair of back support rails 134 may define distal end 316 of step assembly 110 and/or may be configured to support step assembly 110 on ground surface 220 in stair configuration 300 and optionally in ladder configuration 302 (FIGS. 3-4). In some examples, pair of back support rails 134 are longer than pair of lead support rails 132 and/or extend distal of pair of lead support rails 132. In some such examples, pair of lead support rails 132 terminate at, or proximate to, step pivot connections 172 to a distal-most step 120, while pair of back support rails 134 may extend distal of the distal-most step 120 to support step assembly 110 on ground surface 220. Alternatively, pair of lead support rails 132 also may be configured to support step assembly 110 on ground surface 220 and/or may be the same length as pair of back support rails 134.

Step assembly 110 further may include a pair of feet 138 mounted on pair of back support rails 134 on ground surface 220. Specifically, feet 138 may be pivotally coupled to the distal ends of pair of back support rails 134 such that feet 138 may align with ground surface 220 when step assembly 110 is at any suitable angle relative to ground surface 220. For some examples in which pair of lead support rails 132 also are configured to contact ground surface 220, step assembly 110 also may include another pair of feet 138 coupled to distal ends of pair of lead support rails 132.

With continued reference to FIGS. 1-5, step assembly 110 is configured to translate to within and from within guide frame 180 between stowed configuration 304 and either of stair configuration 300 and ladder configuration 302. In particular, guide frame 180 may be configured to constrain or confine motion of step assembly 110 relative to guide frame 180 to one or more predefined paths, such as predefined paths corresponding to translation between the plurality of stepway configurations. As examples, guide frame 180 may be configured to restrict lateral and/or vertical motion of step assembly 110 in deployed configuration 301 by rigidly engaging carriage 116.

As mentioned, guide frame 180 may include a plurality of guide surfaces 182 that guide translation of step assembly 110 within guide frame 180. In some examples, guide surfaces 182 may be low-friction surfaces or include a low-friction coating. As best seen in FIG. 1, guide frame 180 also may include a pair of tracks 184 that extend at least substantially parallel to and spaced apart from one another. Each track 184 may include a base guide surface 186 that at least partially defines guide plane 320 and optionally, an upper guide surface 187 that may be positioned to contact a peripheral, top lateral portion of landing step 122 of carriage 116. In other words, guide frame 180 may be configured to receive step assembly 110 between pair of tracks 184.

Step assembly 110 may include a plurality of guide features 162 that are configured to engage guide surfaces 182 of guide frame 180 to support and/or guide translation of step assembly 110 within guide frame 180. In some examples, guide features 162 extend from the lateral sides 121 of each portion of step assembly 110, such as to support step assembly 110 on base guide surface 186. As a more specific example, step assembly 110 may include a pair of guide features 162 that extend from either lateral side 121 of carriage 116, a pair of guide features 162 that extend from either lateral side 121 of proximal rail portions 142 of pair of back support rails 134, and/or a pair of guide features 162 that extend from either lateral side 121 of distal rail portions 144 of pair of back support rails 134.

Guide frame 180 additionally or alternatively may include a plurality of frame guides that collectively comprise at least some of the guide surfaces 182 and that may be mounted or defined within pair of tracks 184. In such examples, the frame guides of guide frame 180 may be configured to cooperatively mate with guide features 162 of step assembly 110. As more specific examples, guide features 162 may include bumpers tabs, protrusions, rails, and/or ridges that extend from step assembly 110. The frame guides of guide frame 180 may include corresponding structures (e.g., groves, runners, slots, and/or rollers) that receive guide features 162. Additionally or alternatively, guide features 162 may include structures for receiving the frame guides of guide frame 180.

As perhaps best seen in FIG. 5, step assembly 110 and/or guide frame 180 may include one or more pad up features 128 that are configured to restrict motion of step assembly 110 within guide frame 180 when deploying stepway 100 is in stowed configuration 304. For example, pad up features 128 may fill any clearances between guide frame 180 and step assembly 110 that may cause step assembly 110 to rattle within guide frame 180 while vehicle 210 is moving. As more specific examples, pad up features 128 may be formed of a relatively soft or resilient material, such as a plastic or rubber.

With continued reference to FIGS. 1-5, guide frame 180 further may include a locking mechanism 190 that is configured to selectively restrict translation of step assembly 110 relative to guide frame 180. Locking mechanism 190 may be configured to be selectively transitioned between a locking configuration, in which locking mechanism 190 operates to secure step assembly 110 in a specific position relative to or within guide frame 180, and a releasing configuration, in which locking mechanism 190 is configured to permit translation of step assembly 110 relative to guide frame 180. Locking mechanism 190 may be configured to selectively secure step assembly 110 relative to guide frame 180 when deploying stepway 100 is in stair configuration 300, ladder configuration 302, and/or stowed configuration 304. Stated another way, locking mechanism 190 may be configured to secure deploying stepway 100 in stair configuration 300, ladder configuration 302, and/or stowed configuration 304.

More specifically, step assembly 110 may include a plurality of interlock members 192, with each interlock member 192 being configured to interlock with locking mechanism 190 to secure step assembly 110 relative to guide frame 180 in a corresponding stepway configuration. As an example, interlock members 192 may include a stair configuration interlock member 192 that is positioned along carriage 116 to interlock with locking mechanism 190 when deploying stepway 100 is in stair configuration 300. As another example, interlock members 192 may include a ladder configuration interlock member 192 that is positioned along step frame 118 adjacent to, and in the proximal direction of pivot assembly 150, so as to interlock with locking mechanism 190 when deploying stepway 100 is in ladder configuration 302. As yet another example, interlock members 192 may include a stowed configuration interlock member 192 that is positioned adjacent to distal end 316 of step assembly 110 and is configured to interlock with locking mechanism 190 when deploying stepway 100 is in stowed configuration 304. As yet more specific examples, stair configuration interlock member 192 and/or ladder configuration interlock member 192 may be, or be comprised in, corresponding guide features 162. Additionally or alternatively, stowed configuration interlock member 192 may be comprised in a foot 138 of step assembly 110.

More specific examples of locking mechanisms 190 include a latch, a pin, a shaft, a clamp, a hook, a screw, and/or a bolt. For examples in which step assembly 110 comprises a plurality of pivot assemblies 150, step assembly 110 may include an interlock member 192 corresponding to each pivot assembly 150 and/or that interlocks with locking mechanism 190 to secure deploying stepway 100 in each ladder configuration 302.

As shown in FIG. 1, guide frame 180 may include a pair of locking mechanisms 190, for example, that are positioned on or adjacent to either lateral side of guide frame 180. In such examples, step assembly 110 may include a plurality of pairs of interlock members 192 that are configured to interlock with the pair of locking mechanisms 190, such as discussed herein. As a more specific example, step assembly 110 may include a pair of stair configuration interlock members 192 that may be positioned on either lateral side of carriage 116, a pair of ladder configuration interlock members 192 that may be positioned on either lateral side 121 of step frame 118, and/or a pair of stowed configuration interlock members 192 comprised in or adjacent to feet 138.

Deploying stepway 100 and/or the components thereof may be constructed from any suitable materials. As examples, load-bearing portions of deploying stepway 100 may be constructed from one or more metals, alloys, lightweight materials, lightweight metals or alloys, steel, aluminum, titanium, plastics, composite materials, and/or fiber-reinforced composite materials. Typically, the materials utilized in a particular component of deploying stepway 100 may be selected based on the role and/or load supported by the particular component.

FIG. 6 is a schematic side elevation view illustrating examples of deploying stepway 100 in optional ramp configuration 305. Specifically, in the optional examples of FIG. 6, the plurality of stepway configurations further comprises ramp configuration 305, and deploying stepway 100 may be configured to be selectively transitioned to and from ramp configuration 305. Ramp configuration 305 may be described as being in deployed configuration 301. However, unlike stair configuration 300 and ladder configuration 302, the entirety of step assembly 110 may be in condensed configuration 336 when deploying stepway 100 is in ramp configuration 305. In this way, steps 120 are aligned in an end-to-end relationship, with the tread planes 126 being at least substantially parallel to step frame 118. Additionally, proximal portion 112 and distal portion 114 of step assembly 110 are aligned with one another. In this way, step assembly 110 may be utilized as a ramp to elevated point of egress 212 when deploying stepway 100 is in ramp configuration 305.

As shown in FIG. 6, proximal portion 112 and distal portion 114 of step assembly 110 extend from guide frame 180, and distal end 316 of step assembly 110 may be supported on ground surface 220, for example, by feet 138. Step assembly 110 is oriented at a declined ramp angle 313. Declined ramp angle 313 may be at least substantially the same as, or greater than, the declined stair angle.

In these examples, step assembly 110 further comprises a ramp coupling mechanism 166 that is disposed along carriage 116, such as near proximal end 314 thereof. Ramp coupling mechanism 166 is configured to selectively couple carriage 116 to guide frame 180 with step assembly 110 oriented at declined ramp angle 313. As a more specific example, ramp coupling mechanism 166 may include a receiver that is configured to selectively interlock with locking mechanism 190 of guide frame 180. For some examples in which deploying stepway 100 comprises ramp configuration 305, step assembly 110 further includes a condensed configuration lockout mechanism 164 that is configured to selectively secure step assembly 110 in condensed configuration 336. As examples, condensed configuration lockout mechanism 164 may include a latch, a strap, a bolt, a hook, a loop, and/or a clamp that is configured to selectively couple pair of lead support rails 132 to pair of back support rails 134 at the minimum rail spacing.

FIGS. 7-17 provide illustrative, non-exclusive examples of deploying stepways 100 that are indicated at and referred to herein as deploying stepway 400, pivot assemblies 150 of deploying stepway 400, and vehicles 210 comprising deploying stepway 400. Where appropriate, the reference numerals from the schematic illustrations of FIGS. 1-6 are used to designate corresponding parts in FIGS. 7-17; however, the examples of FIGS. 7-17 are non-exclusive and do not limit deploying stepways 100 to illustrative embodiments of FIGS. 7-17. That is, deploying stepways 100 are not limited to the specific embodiments of FIGS. 7-17, and deploying stepways 100 may incorporate any number of the various aspects, configurations, characteristics, properties, etc. that are illustrated in and discussed with reference to the schematic representations of FIGS. 1-6 and/or the embodiments of FIGS. 7-17, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labelled again with respect to FIGS. 7-17; however, it is within the scope of the present disclosure that the previously discussed features, functions, variants, etc. may be utilized with the examples of FIGS. 7-17.

Figure 7:
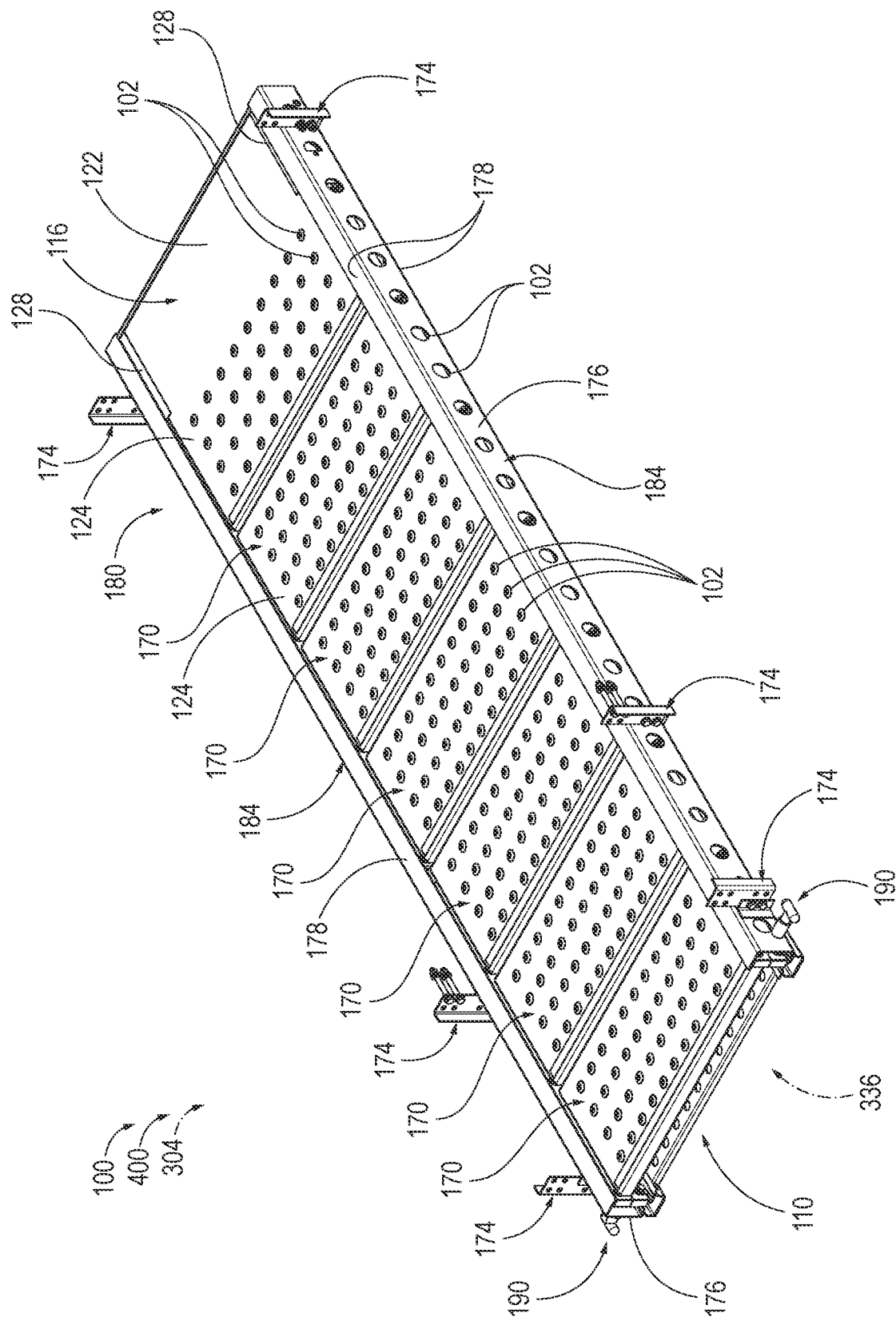
FIG. 7 is an isometric view illustrating an example deploying stepway in the stowed configuration, according to the present disclosure.

FIG. 7 illustrates deploying stepway 400 in stowed configuration 304. As shown, step assembly 110 is in condensed configuration 336 such that steps 120 are at least substantially coplanar with one another and with landing step 122. Step assembly 110 is completely received and secured within guide frame 180. Guide frame 180 includes pair of tracks 184 that extend a length of guide frame 180 and that receive step assembly 110 therebetween. Specifically, pair of tracks 184 are positioned on either lateral side of step assembly 110. Each track 184 of the pair of tracks 184 includes a U-shaped configuration with a vertical sidewall 176 and a pair of flanges 178 that project from upper and lower ends of vertical sidewall 176 and transverse to vertical sidewall 176. Each flange 178 of the pair of flanges 178 projects over peripheral top and bottom lateral side portions of step assembly 110, while vertical sidewall 176 extends at least substantially parallel to the lateral sides of step assembly 110.

Guide frame 180 includes pair of locking mechanisms 190 that are engaged with step assembly 110 and secure step assembly 110 within guide frame 180 in the position shown. Guide frame 180 also includes a plurality of vehicle attachment features 174 attached to pair of tracks 184 and configured to attach guide frame 180 and deploying stepway 400 to a vehicle. Step assembly 110 further includes pad up features 128 that are attached to carriage 116 and that fill clearances between carriage 116 and guide frame 180. In this example, deploying stepway 400 includes a plurality of lightening features 102 that reduce the weight of deploying stepway 400. These lightening features 102 include bores formed in pair of tracks 184 and bores formed in the treads 124 of steps 120 and landing step 122.

Figure 8:
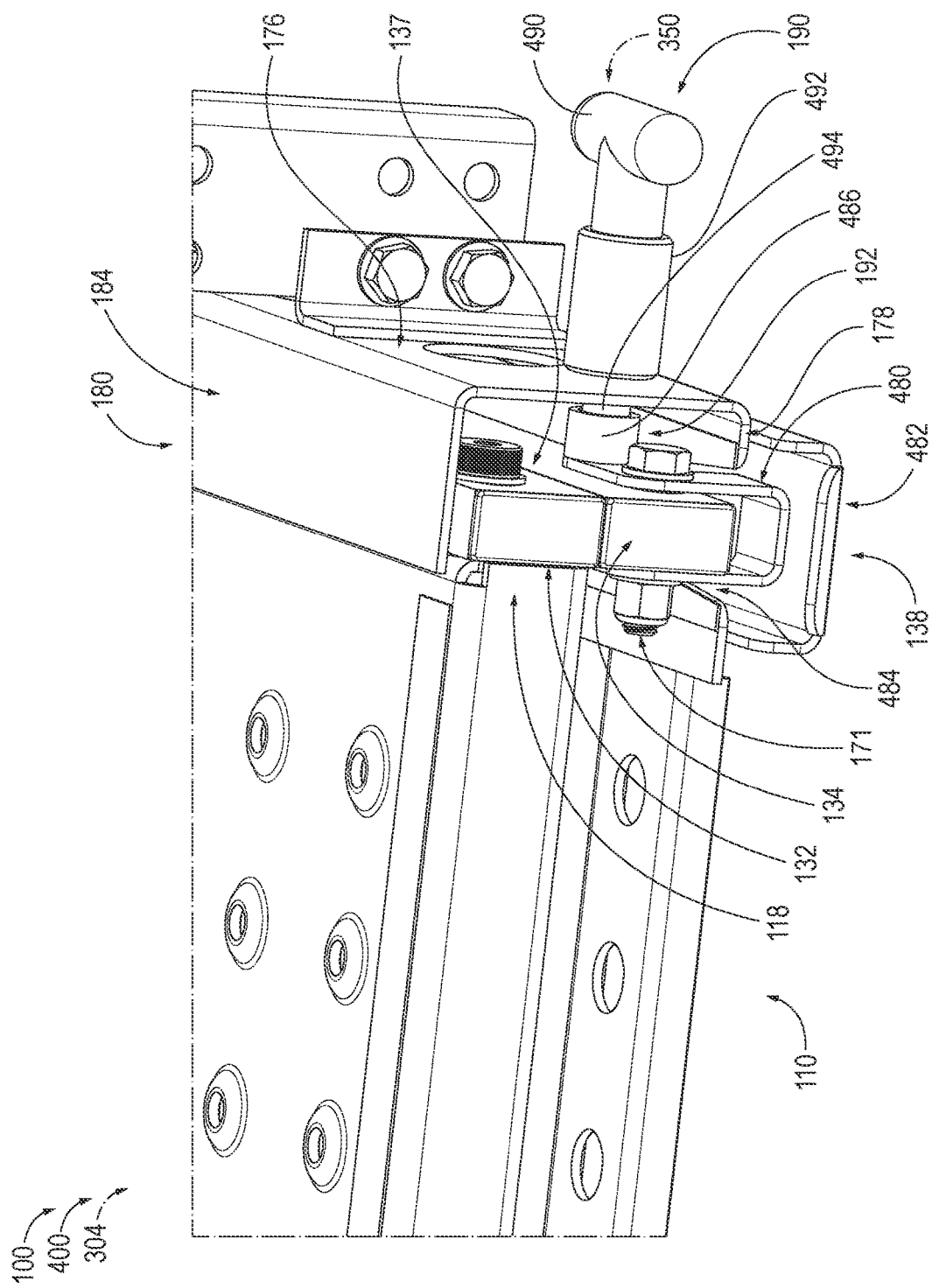
FIG. 8 is a partial isometric view of the example deploying stepway of FIG. 7 in the stowed configuration.

FIG. 8 is a partial view of deploying stepway 400 in stowed configuration 304 showing one locking mechanism 190 of the pair of locking mechanisms, 190 and a distal corner region of step assembly 110. As shown, locking mechanism 190 is mounted on vertical sidewall 176 and extends generally transverse thereto. Locking mechanism 190 includes a handle 490 rigidly coupled to a lockbolt 494, and a barrel 492 secured to vertical sidewall 176. Barrel 492 includes an internal channel through which lockbolt 494 extends and that may receive a portion of handle 490. The internal channel of barrel 492 is aligned with an aperture formed in vertical sidewall 176, and barrel 492 positions lockbolt 494 to extend through the aperture in vertical sidewall 176 and into the internal volume of guide frame 180.

In this example, step frame 118 includes pair of lead support rails 132 and pair of back support rails 134 that form a portion of the lateral sides 121 of step assembly 110. Pair of feet 138 are pivotally coupled to distal ends of pair of back support rails 134 by a foot pivot connection 171, with only one foot 138 of the pair of feet 138 shown in the view of FIG. 8. Foot 138 includes a foot bracket 480 that is pivotally coupled to back support rail 134 by foot pivot connection 171, and that is fixedly coupled to a foot base 482 that is configured to contact the ground surface. Foot pivot connection 171 permits the weight of foot 138 to orient along with a direction of gravity, such that foot base 482 is positioned beneath a lower flange 178 of track 184. The lower flange 178 of track 184 is provided with a foot slot 484 that receives foot bracket 480 in this orientation. Foot slot 484 may engage foot bracket 480 to restrict lateral motion of step assembly 110 within guide frame 180 when deploying stepway 400 is in stowed configuration 304.

Each foot 138 also includes interlock member 192 that is configured to interlock with locking mechanism 190 to secure deploying stepway 100 in stowed configuration 304. More specifically, interlock member 192 includes a tubular collar 486 that is attached to foot bracket 480 and configured to receive lockbolt 494 of locking mechanism 190. Specifically, in the example shown, locking mechanism 190 is in a locking configuration 350 with lockbolt 494 received in tubular collar 486. In the locking configuration 350, locking mechanism 190 is configured to restrict step assembly 110 from translating out of guide frame 180. Locking mechanism 190 also may operate to restrict step assembly 110 from translating vertically within guide frame 180, which may prevent or reduce rattling during transit.

Locking mechanism 190 is configured to selectively transition between locking configuration 350 and a releasing configuration, in which locking mechanism 190 permits translation of step assembly 110 relative to guide frame 180. Specifically, handle 490 and lockbolt 494 may be mounted within barrel 492 for selective translation within the internal channel of barrel 492 within a predefined range. To transition locking mechanism 190 from locking configuration 350 to the releasing configuration, handle 490 may be engaged to retract lockbolt 494 from tubular collar 486 of foot 138. In some examples, locking mechanism 190 is biased towards locking configuration 350, for example by a spring mechanism installed in barrel 492 that urges lockbolt 494 towards tubular collar 486 and/or towards the internal volume of guide frame 180. Additionally or alternatively, locking mechanism 190 may include a twist lock mechanism in which handle 490 is rotated to retract and extend lockbolt 494 from barrel 492. In some such examples, lockbolt 494 is in threaded engagement with barrel 492 such that turning handle causes linear motion of lockbolt 494. In some examples, locking mechanism 190 may be bistable, in that once transitioned to locking configuration 350 or the releasing configuration, locking mechanism 190 is configured to remain in locking configuration 350 or the releasing configuration until locking mechanism 190 is selectively actuated.

While FIG. 8 and the discussion herein with reference thereto, focus on one locking mechanism 190 of the pair of locking mechanisms, it should be understood that the examples presented with respect to FIG. 8 equally apply to either of pair of locking mechanisms 190 illustrated in FIG. 7. This also applies to the discussion herein with respect to the partial views of FIGS. 11 and 13. Additionally, pair of locking mechanisms 190 according to the present disclosure are not limited to the examples of FIG. 8 and each locking mechanism 190 may include any suitable mechanism for selectively securing step assembly 110 relative to guide frame 180. As examples, each locking mechanism 190 additionally or alternately may include an electrically actuated mechanism, an electro-mechanically actuated mechanism, a magnetically actuated mechanism, and/or combinations thereof.

Figure 9:
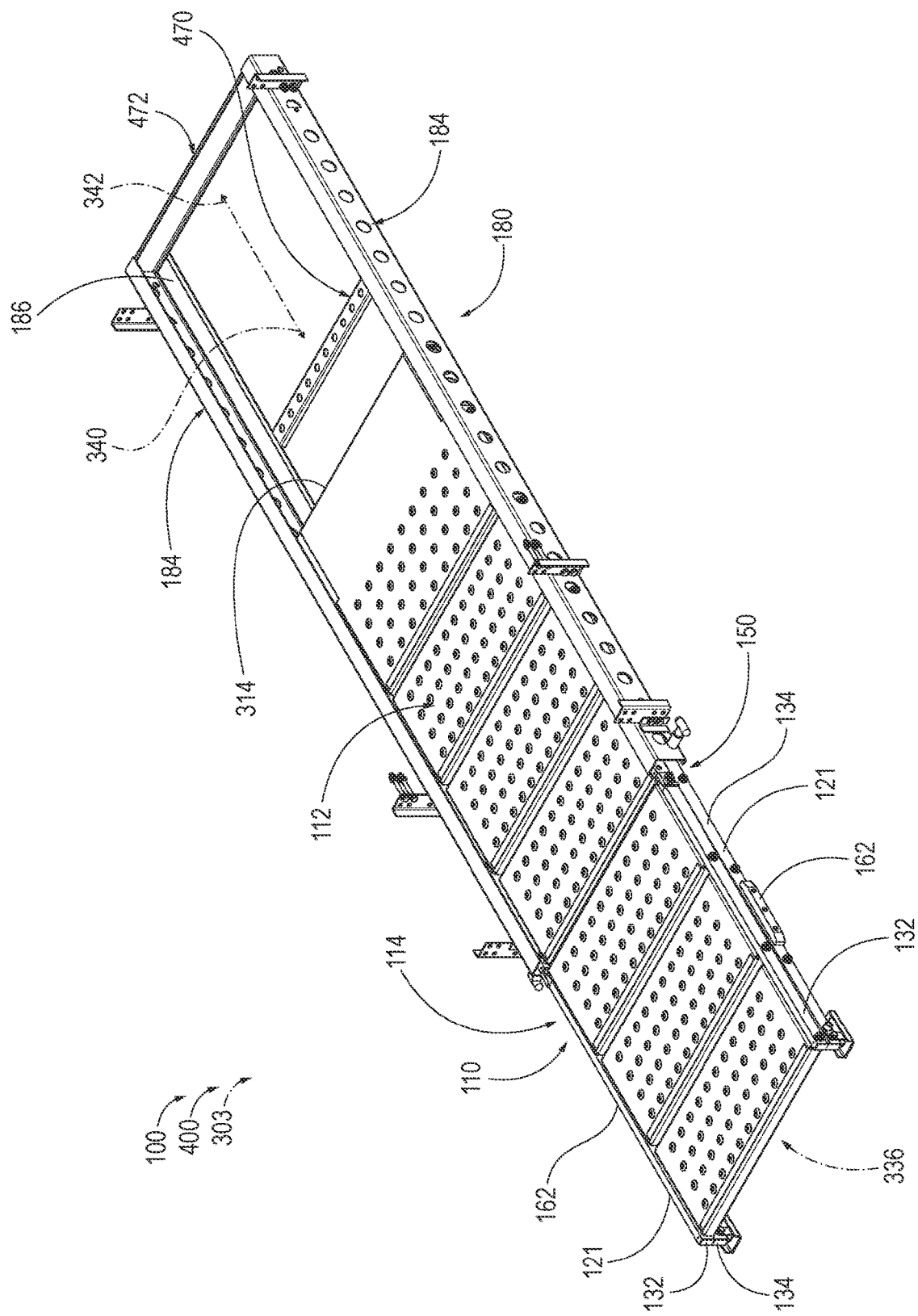
FIG. 9 is an isometric view of the example deploying stepway of FIG. 7 in a partially deployed configuration.

FIG. 9 illustrates deploying stepway 400 in a partially deployed configuration 303. As shown, step assembly 110 is moved in forward direction 340 from the stowed configuration 304, shown in FIG. 7, such that a portion of step assembly 110 protrudes from guide frame 180. Specifically, some of, but less than all of, distal portion 114 of step assembly 110 protrudes from guide frame 180 and a portion of pivot assembly 150 is received in guide frame 180. Pair of tracks 184 of guide frame 180 operatively engage pair of lead support rails 132 and pair of back support rails 134 to maintain the entirety of step assembly 110 in condensed configuration 336. In other words, guide frame 180 prevents distal portion 114 of step assembly 110 from pivoting about pivot assembly 150 relative to proximal portion 112 of step assembly 110 when at least a portion of pivot assembly 150 is received within guide frame.

As further shown, step assembly 110 includes guide features 162 that are mounted on lateral sides 121 of pair of back support rails 134 and that are configured to engage base guide surfaces 186, comprised in pair of tracks 184 of guide frame 180, to support step assembly 110 within guide frame 180 and to guide translation of step assembly 110 along guide frame 180. Guide frame 180 includes cross support frames 470 (one is obscured by step assembly 110 in FIG. 9) and end support frame portion 472 that extend between pair of tracks 184 and support pair of tracks 184 with the desired separation therebetween. End support frame 472 also may be configured to engage proximal end 314 of step assembly 110 in stowed configuration 304 to brace step assembly 110 against translating in rear direction 342 from guide frame 180.

Figure 10:
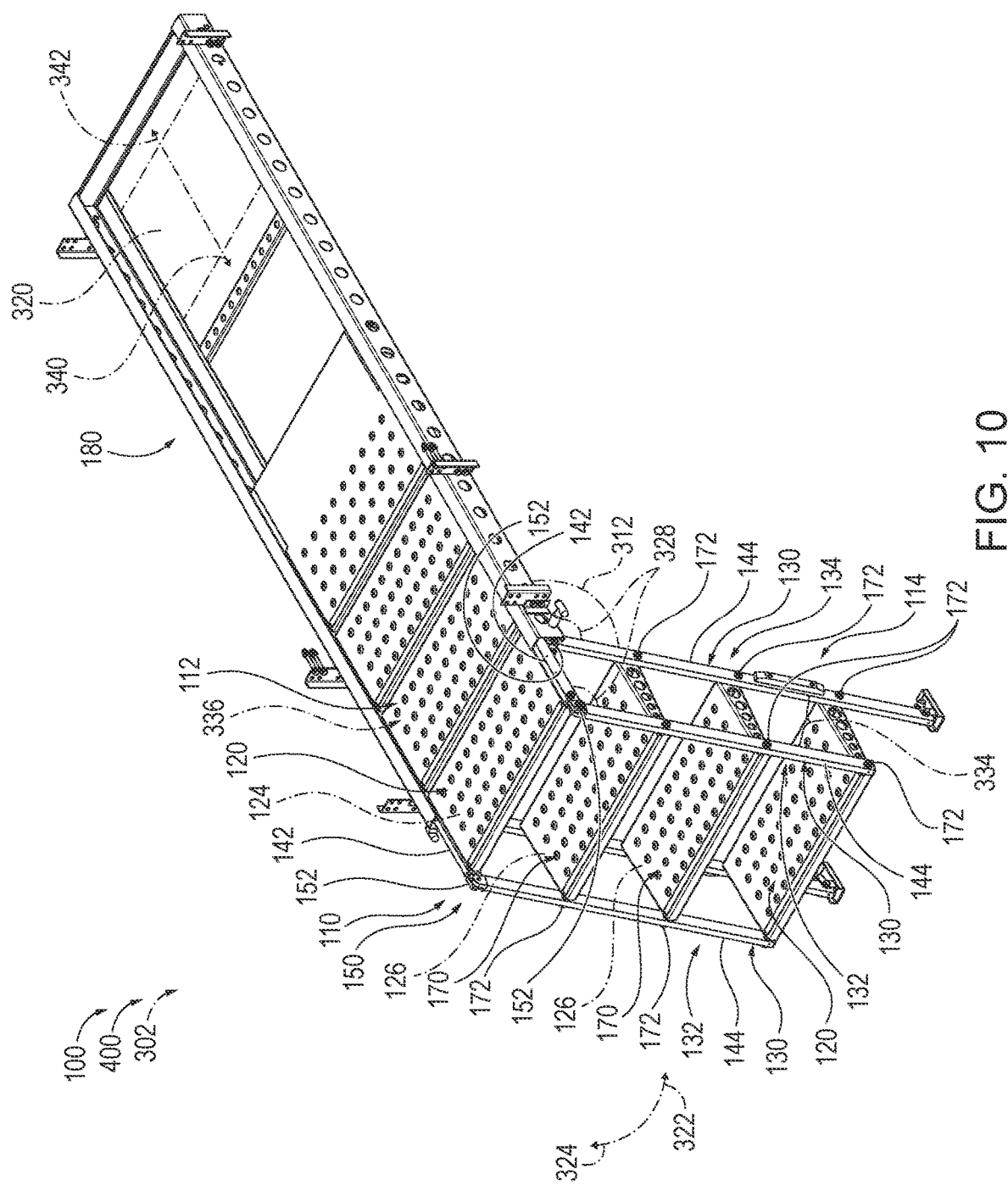
FIG. 10 is an isometric view of the example deploying stepway of FIG. 7 in the ladder configuration.

FIG. 10 illustrates deploying stepway 400 in ladder configuration 302. As shown, step assembly 110 is moved in forward direction 340 from the position of step assembly 110 shown in FIG. 9, such that the entirety of distal portion 114 of step assembly 110 protrudes from guide frame 180. Pivot assembly 150 comprises four pivot mechanisms 152, two of which are comprised in pair of lead support rails 132 and operatively couple proximal rail portions 142 thereof to distal rail portions 144 thereof. The two other pivot mechanisms 152 are comprised in pair of back support rails 134 and operatively couple proximal rail portions 142 thereof to distal rail portions 144 thereof. Proximal portion 112 of step assembly 110 partially is received within guide frame 180 and maintained in condensed configuration 336, at least in part by engagement with guide frame 180. Distal portion 114 of step assembly 110 is pivoted about pivot assembly 150 in first direction 322 relative to proximal portion 112 to declined ladder angle 312. In other words, distal portion 114 of step assembly 110 may be described as being in an operable, expanded, or non-condensed configuration.

Proximal rail portions 142 of pair of lead support rails 132 extend in forward direction 340 of guide frame 180 such that pivot mechanisms 152 of pair of lead support rails 132 are offset in forward direction 340 of pivot mechanisms 152 of pair of back support rails 134, for example, by the horizontal rail offset discussed herein. Distal rail portion 144 of each support rail 130 is pivoted about a corresponding pivot mechanism 152 to threshold ladder angle 328 relative to the proximal rail portion 142 thereof. As discussed in more detail herein, pivot mechanisms 152 may be configured to support distal rail portions 144 at threshold ladder angle 328.

A set of three steps 120 are pivotally coupled between distal rail portions 144 of pair of lead support rails 132 and pair of back support rails 134 by step pivot connections 172. Pivot assembly 150 is positioned immediately adjacent to and in the distal direction of a distal-most step 120 of proximal portion 112 of step assembly 110. A region of the distal-most step 120 of proximal portion 112 is positioned exterior to guide frame 180 and forms the uppermost step 120 in ladder configuration 302. Steps 120 support distal rail portions 144 of pair of lead support rails 132 to extend at least substantially parallel to distal rail portions 144 of pair of back support rails 134. Support rails 130 likewise support steps 120 such that the tread planes 126 thereof are at least substantially parallel to one another and/or to guide plane 320. In some examples, distal rail portions 144 are positioned to extend through the foot slots 484 in guide frame 180 that are illustrated in FIG. 8.

To transition deploying stepway 400 from ladder configuration 302 towards stowed configuration 304, distal rail portions 144 are pivoted in second direction 324 about pivot mechanisms 152. The pivotal coupling of steps 120 between distal rail portions 144 causes distal rail portions 144 to move in tandem with one another and the rail spacing 334 therebetween to decrease as distal portion 114 of step assembly 110 is pivoted in second direction 324.

Figure 11:
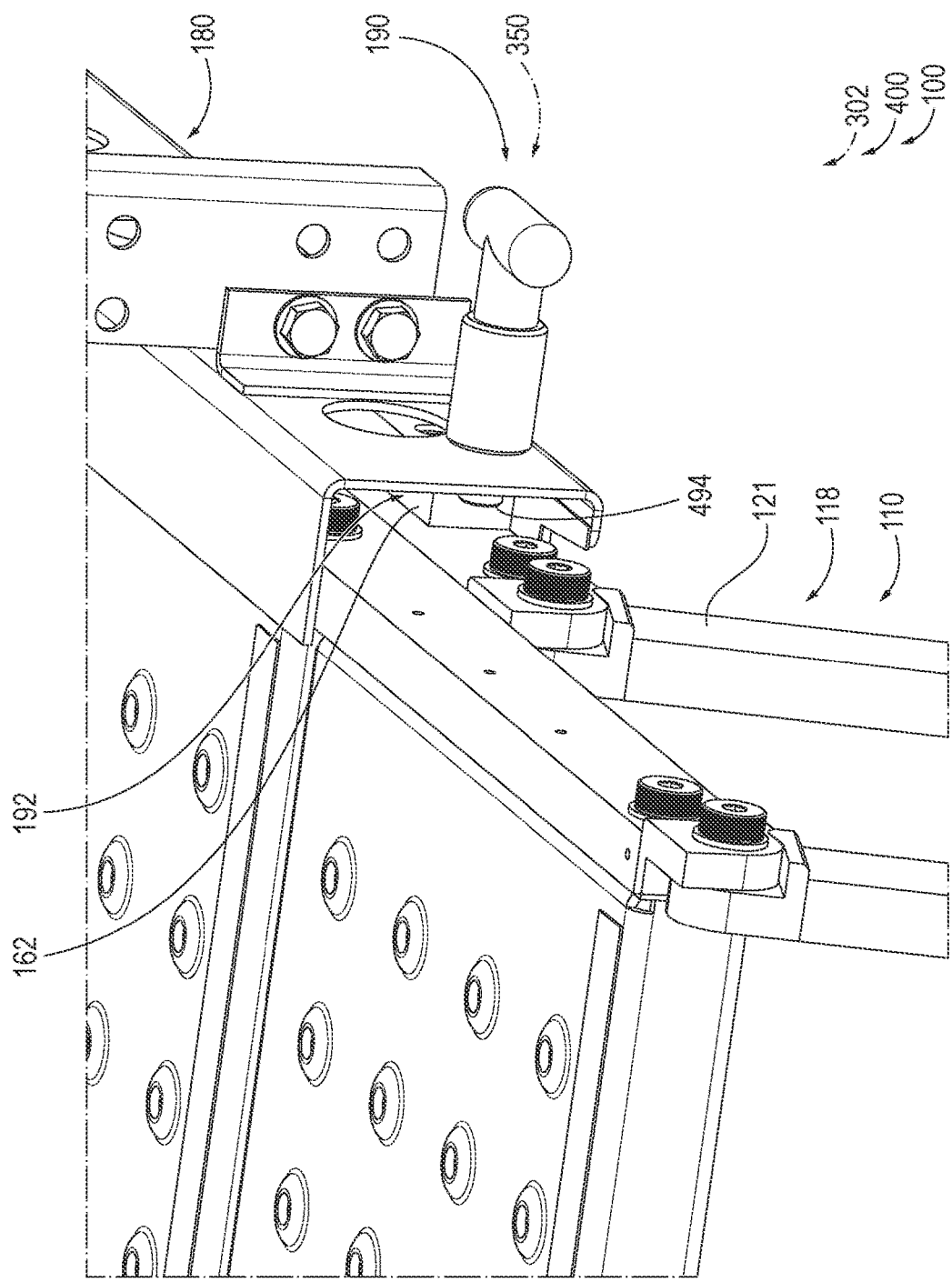
FIG. 11 is a partial isometric view of the example deploying stepway of FIG. 7 in the ladder configuration.

FIG. 11 is a partial isometric view of deploying stepway 400 in ladder configuration 302, showing locking mechanism 190 of guide frame 180 and a portion of step assembly 110. As shown, locking mechanism 190 is configured to engage step assembly 110 to prevent step assembly 110 from translating relative to guide frame 180 when deploying stepway 400 is in ladder configuration 302. More specifically, with locking mechanism 190 in locking configuration 350, lockbolt 494 of locking mechanism 190 is positioned to engage guide feature 162 that protrudes from lateral side 121 of step frame 118. Engagement of guide feature 162 with lockbolt 494 is configured to prevent translation of step assembly 110 in forward direction 340 from guide frame 180. In other words, guide feature 162 forms an interlock member 192. In some examples, guide feature 162 comprises a dedicated receiver, for example a bore, for receiving lockbolt 494.

Figure 12:
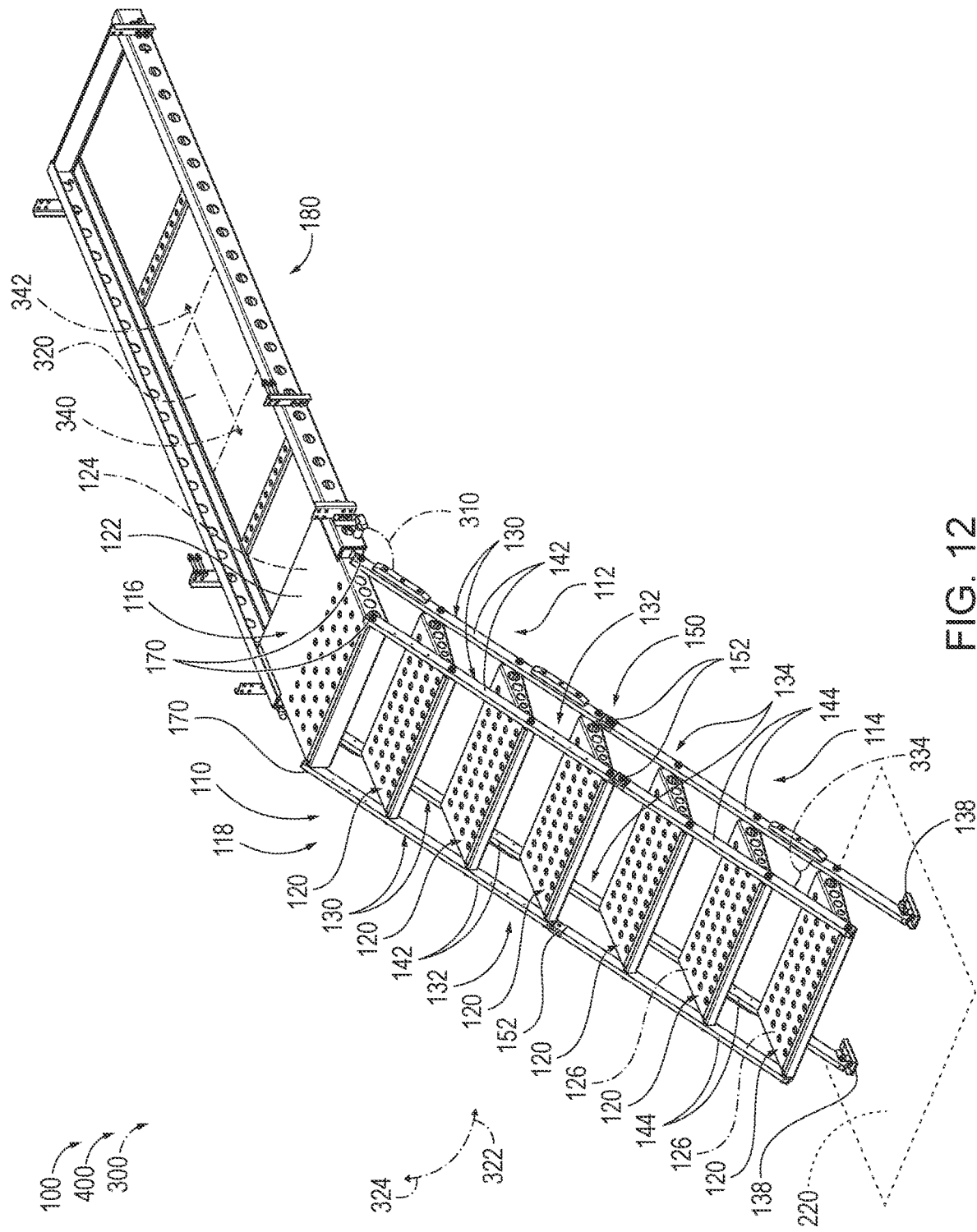
FIG. 12 is an isometric view illustrating the example deploying stepway of FIG. 7 in the stair configuration.

FIG. 12 illustrates deploying stepway 400 in stair configuration 300. As shown, step assembly 110 is translated in forward direction 340 from the position shown in FIG. 10, such that the entirety of proximal portion 112 and the entirety of distal portion 114 of step assembly 110 extend from guide frame 180. Proximal portion 112 of step assembly 110 is pivotally coupled to carriage 116 by pivot connections 170, and a portion of carriage 116 is received in and supported by guide frame 180. In other words, carriage 116 couples step assembly 110 to guide frame 180 in stair configuration 300. Carriage 116 includes landing step 122, and carriage 116 is supported by guide frame 180 such that tread plane 126 defined by landing step 122 is at least substantially parallel to guide plane 320 defined by guide frame 180. Distal portion 114 and proximal portion 112 are at least substantially aligned with one another about pivot assembly 150, and step frame 118 is pivoted in first direction 322 relative to carriage 116, such that step assembly 110 extends at declined stair angle 310 relative to guide frame 180.

More specifically, pair of lead support rails 132 are pivotally coupled to carriage 116 offset in forward direction 340 of pair of back support rails 134. Steps 120 are pivotally coupled between pair of lead support rails 132 and pair of back support rails 134, and steps 120 support pair of lead support rails 132 to extend at least substantially parallel to pair of back support rails 134. Support rails 130 likewise support steps 120 such that the tread planes 126 thereof are at least substantially parallel to one another and to guide plane 320. Pivot mechanisms 152 support distal rail portions 144 to be at least substantially aligned with proximal rail portions 142. Pair of back support rails 134 support step assembly 110 on ground surface 220 via pair of feet 138. In this example, pair of back support rails 134 are longer than pair of lead support rails 132, with pair of lead support rails 132 terminating proximate to a distal-most step 120 of step assembly 110 and/or above ground surface 220. In such a configuration, the distal ends of pair of lead support rails 132 are at least substantially aligned with the distal ends of pair of back support rails 134 in stowed configuration 304, which reduces the length of step assembly 110 in stowed configuration 304 and may improve the storability thereof.

To transition deploying stepway 400 towards stowed configuration 304 from stair configuration 300, step frame 118 is pivoted in second direction 324 about pivot connections 170 towards alignment with carriage 116 or towards being parallel to guide plane 320. Pivoting step frame 118 in second direction 324 also causes rail spacing 334 to decrease and step assembly 110 to move towards the condensed configuration. Once in condensed configuration 336 and at least substantially parallel to guide plane 320, step assembly 110 may be translated into guide frame 180.

Figure 13:
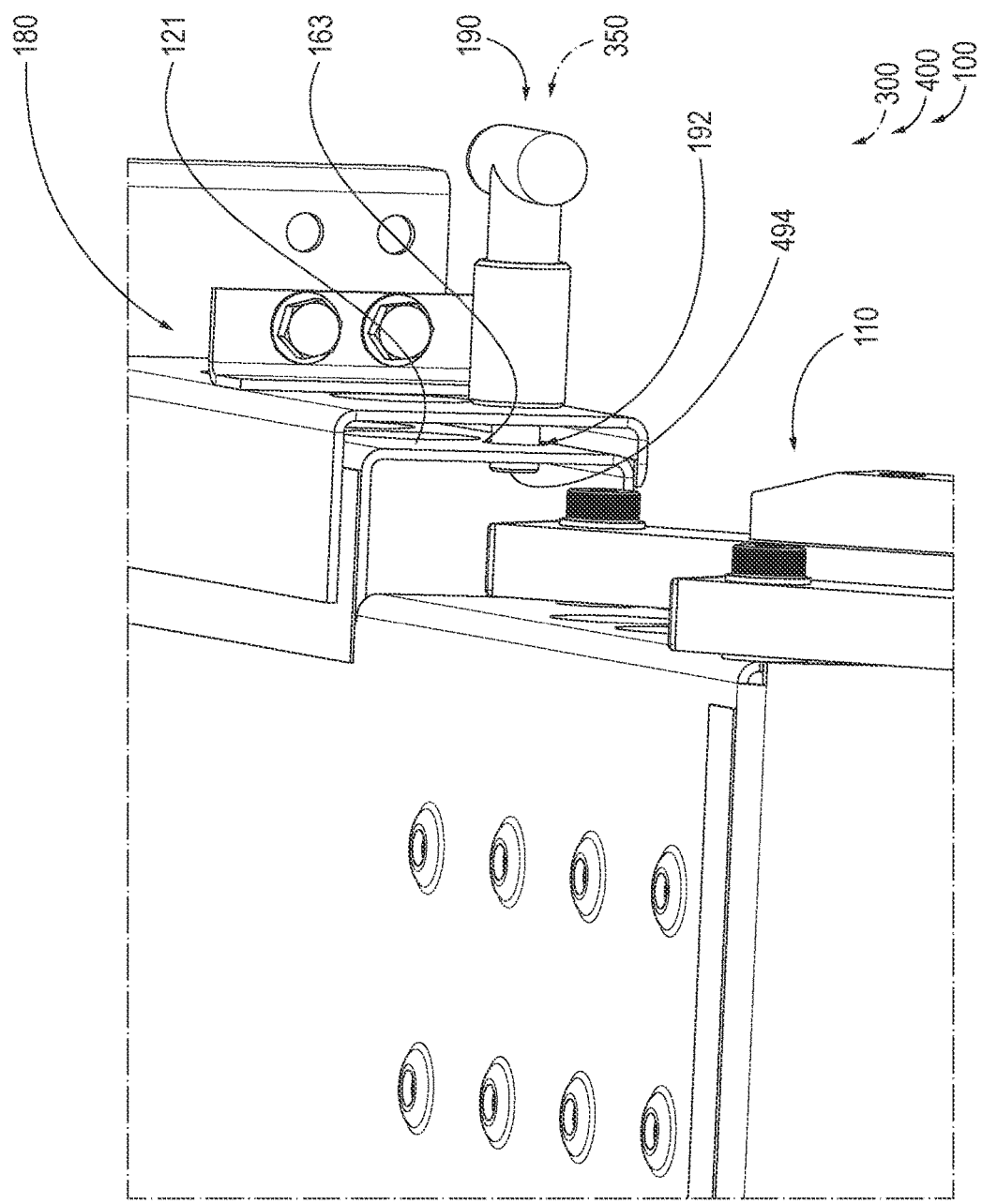
FIG. 13 is a partial isometric view of the example deploying stepway of FIG. 7 in the stair configuration.

FIG. 13 is a partial isometric view of deploying stepway 400 in stair configuration 300 showing locking mechanism 190 and a portion of step assembly 110. As shown, locking mechanism 190 is configured to engage step assembly 110 to prevent step assembly 110 from translating relative to guide frame 180 when deploying stepway 400 is in stair configuration 300. More specifically, with locking mechanism 190 in locking configuration 350, lockbolt 494 of locking mechanism 190 is received in a slot receiver 163 formed in lateral side 121 of carriage 116. Engagement of slot receiver 163 with lockbolt 424 is configured to prevent translation of step assembly 110 in forward direction 340 relative to guide frame 180. In other words, slot receiver 163 forms an interlock member 192. In other words, locking mechanism 190 may operate to retain step assembly 110 attached to guide frame 180 in stair configuration 300.

Figure 14:
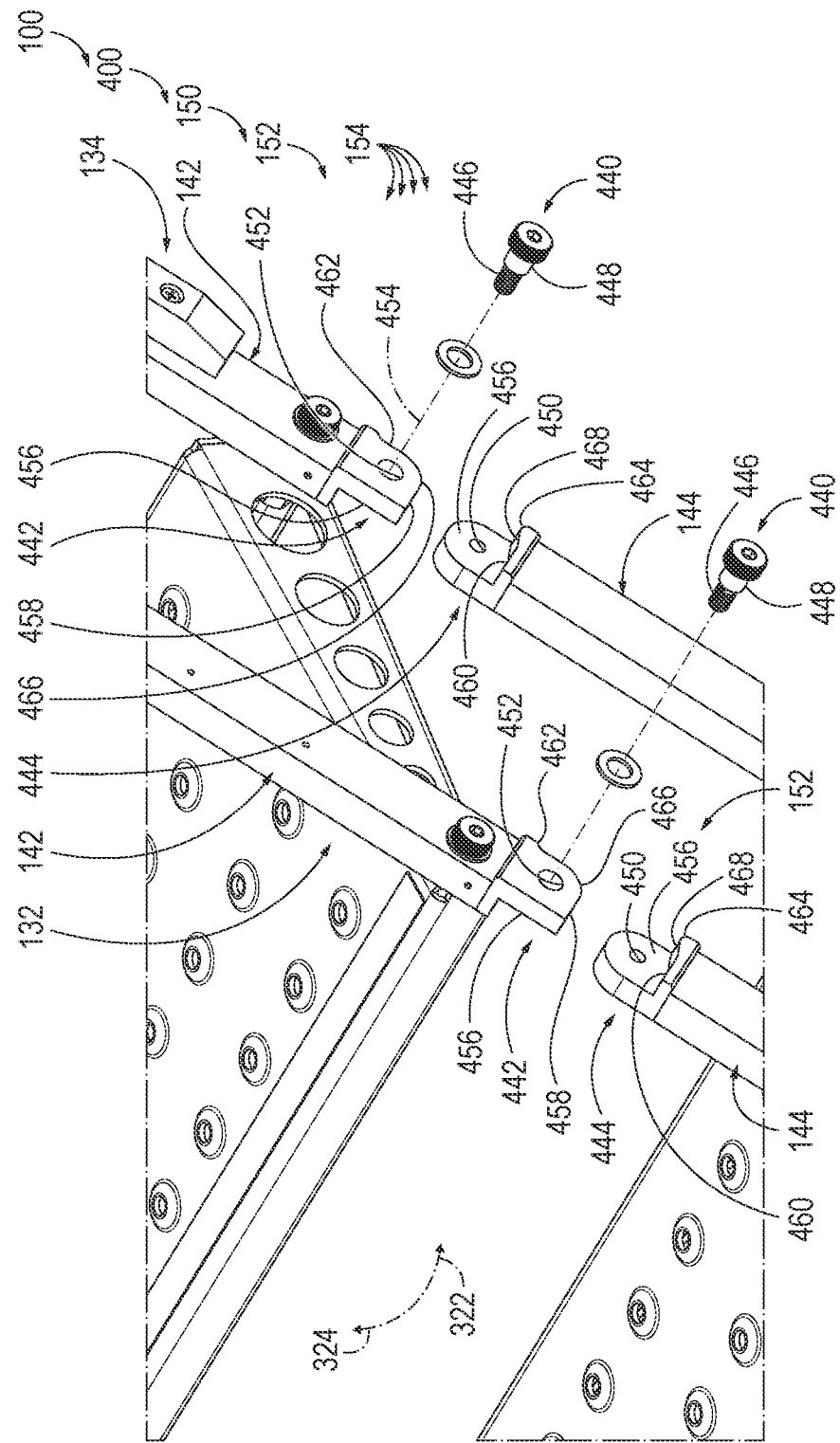
FIG. 14 is a partial exploded view of the example deploying stepway of FIG. 7, showing a portion of the pivot assembly thereof.

FIG. 14 is a partial exploded view showing two pivot mechanisms 152 of pivot assembly 150 of deploying stepway 400. As shown, each pivot mechanism 152 includes a proximal pivot mechanism portion 442 that is fixed to proximal rail portion 142 and a distal pivot mechanism portion 444 that is fixed to distal rail portion 144. Proximal pivot mechanism portion 442 and distal pivot mechanism portion 444 may be fixed to the respective rail portions in any suitable manner. For example, proximal pivot mechanism portion 442 and distal pivot mechanism portion 444 may be fixedly coupled to (e.g., by a fastener), welded to, and/or integral with the respective rail portion. Pivot mechanism 152 also includes a pin coupling 440 that pivotally couples proximal pivot mechanism portion 442 to distal pivot mechanism portion 444 and that defines the pivot axis of pivot mechanism 152. In other words, proximal pivot mechanism portion 442 and distal pivot mechanism portion 444 are configured to pivot relative to one another about pin coupling 440. For example, pin coupling 440 may include a bolt with a threaded portion 446 that is received in a threaded bore 450, formed in distal pivot mechanism portion 444, and a smooth collar 448 that is received in a bushing bore 452, formed in proximal pivot mechanism portion 442.

Proximal pivot mechanism portion 442 and distal pivot mechanism portion 444 each comprises a bearing surface 456 that extends normal to pivot axis 454. The bearing surfaces 456 of proximal pivot mechanism portion 442 and distal pivot mechanism portion 444 are held together or in close proximity to one another by pin coupling 440, and may glide relative to one another as proximal pivot mechanism portion 442 and distal pivot mechanism portion 444 pivot relative to one another.

Pivot mechanism 152 further comprises pivot restrictors 154 that are configured to restrict pivotal movement of proximal rail portion 142 and distal rail portion 144 to within a threshold range of angles. More specifically, proximal pivot mechanism portion 442 comprises a proximal alignment restricting surface 458 and distal pivot mechanism portion 444 comprises a distal alignment restricting surface 460. Proximal alignment restricting surface 458 and distal alignment restricting surface 460 extend normal to bearing surface 456 and/or parallel to pivot axis 454. Proximal alignment restricting surface 458 and distal alignment restricting surface 460 also may be planar, and extend at least substantially normal to bearing surface 456, and optionally normal to a length of the corresponding rail portion.

Proximal alignment restricting surface 458 and distal alignment restricting surface 460 engage one another when distal rail portion 144 is pivoted in second direction 324 into alignment with proximal rail portion 142 and alignment restricting surfaces 458, 460 restrict distal rail portion 144 from pivoting beyond alignment with proximal rail portion 142. In other words, proximal alignment restricting surface 458 and distal alignment restricting surface 460 define a pivot restrictor 154 that is configured to restrict proximal rail portion 142 and distal rail portion 144 from pivoting beyond the threshold alignment angle.

Proximal pivot mechanism portion 442 also includes a proximal ladder restricting surface 462 that is circumferentially offset from proximal alignment restricting surface 458 about pivot axis 454, for example, by an angle corresponding to the difference between the threshold alignment angle and the threshold ladder angle. Proximal pivot mechanism portion 442 also may include an arcuate surface 466 that extends between proximal ladder restricting surface 462 and proximal alignment restricting surface 458, optionally at a fixed radius from pivot axis 454. Similarly, distal pivot mechanism portion 444 includes a distal ladder restricting surface 464 that is circumferentially offset from distal alignment restricting surface 460 and may include an intermediate surface 468 therebetween.

Proximal ladder restricting surface 462 and distal ladder restricting surface 464 are configured to engage one another when distal rail portion 144 is pivoted in first direction 322 to the threshold ladder angle relative to proximal rail portion 142 and ladder restricting surfaces 462, 464 restrict distal rail portion 144 from pivoting in first direction 322 beyond threshold ladder angle relative to proximal rail portion 142. In other words, proximal ladder restricting surface 462 and distal ladder restricting surface 464 define a pivot restrictor 154 that is configured to restrict proximal rail portion 142 and distal rail portion 144 from pivoting beyond the threshold ladder angle. Thus, pivot restrictors 154 are configured to restrict pivotal movement of distal rail portion 144 relative to proximal rail portion 142 to between the threshold ladder angle and the threshold alignment angle. When distal rail portion 144 pivots between the threshold ladder angle and the threshold alignment angle, arcuate surface 466 of proximal pivot mechanism portion 442 may glide along intermediate surface 468.

FIGS. 15-16 illustrate examples of a vehicle 210 that comprises deploying stepway 400. More specifically, FIG. 15 illustrates an example of deploying stepway 400 in stowed configuration 304. As shown in FIG. 15, deploying stepway 400 is completely contained within vehicle 210 and/or does not extend beyond the width of the vehicle.

FIG. 16 illustrates deploying stepway 400 in stair configuration 300. As shown, guide frame 180 is mounted beneath an elevated point of egress 212 comprised in vehicle 210, for example, a door to an interior living space. Guide frame 180 is mounted at nominal height 222 above ground surface 220 and step assembly 110 extends from guide frame 180 at the declined ladder angle such that the feet 138 thereof rest on ground surface 220. Each step 120 of step assembly 110 is deployed from guide frame 180 and steps 120 lead to elevated point of egress 212 at the declined stair angle.

Figure 17:
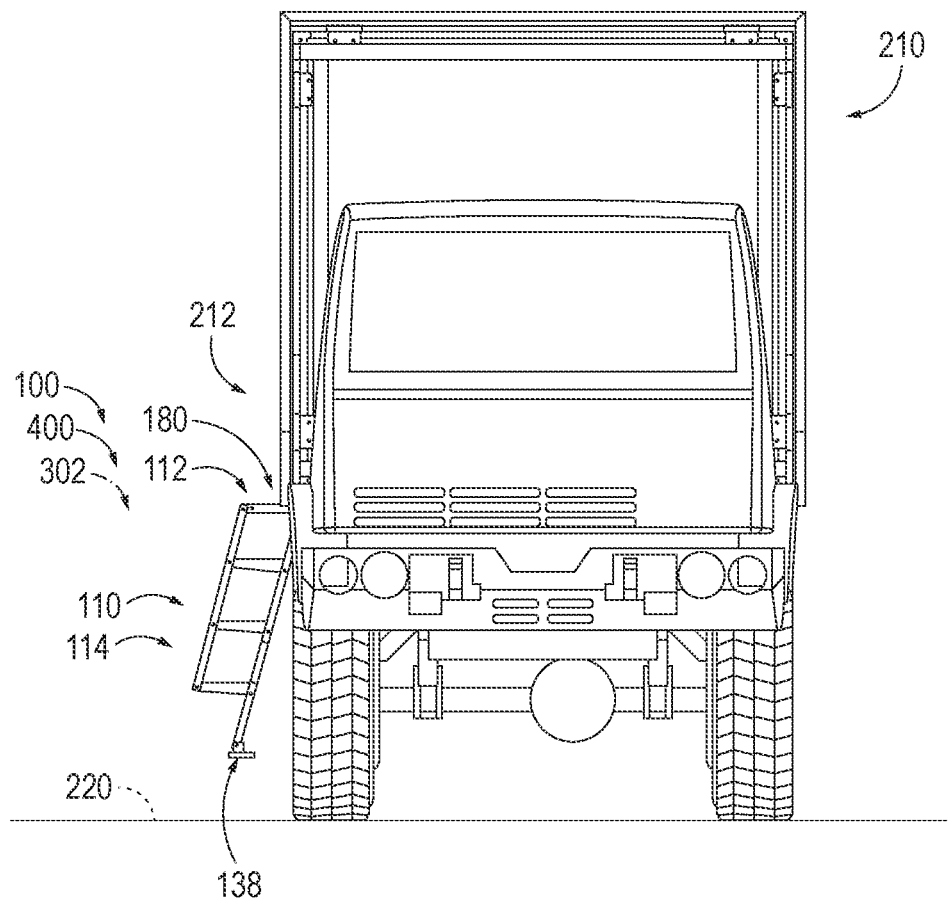
FIG. 17 is an elevation view of the vehicle of FIG. 15 with the deploying stepway in the ladder configuration.

FIG. 17 illustrates deploying stepway 400 in ladder configuration 302. As shown, distal portion 114 of step assembly 110 extends from guide frame 180 at the declined ladder angle, while a majority of proximal portion 112 of step assembly 110 is received in guide frame 180, except for a distal-most portion of proximal portion 112, which protrudes from guide frame 180 at least substantially parallel to ground surface 220. In this example, distal portion 114 of step assembly 110 is dimensioned such that feet 138 of step assembly 110 are spaced above ground surface 220. Ladder configuration 302 may be utilized instead of stair configuration 300 for examples in which clearance on the sides of the vehicle is limited and/or when quick access to the elevated point of egress is desired.

Figure 18:
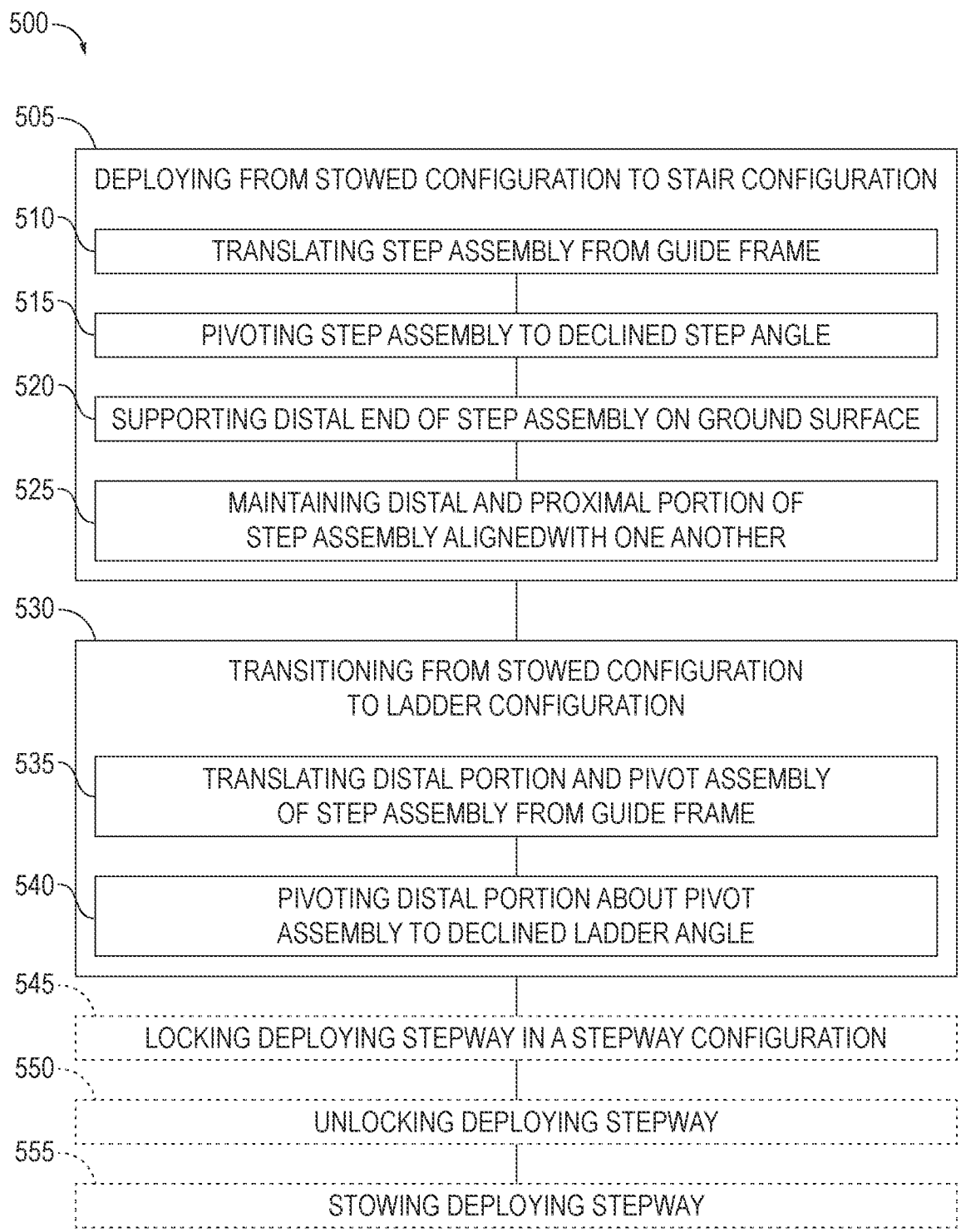
FIG. 18 is a flowchart schematically representing examples of methods according to the present disclosure.

FIG. 18 schematically provides a flowchart that represents illustrative, non-exclusive examples of methods 500 of operating deploying stepways according to the present disclosure. In FIG. 18, some steps are illustrated in dashed boxes, indicating that such steps may be optional or may correspond to an optional version of a method according to the present disclosure. That said, not all methods according to the present disclosure are required to include the steps illustrated in solid boxes. The methods and steps illustrated in FIG. 18 are not limiting and other methods and steps are within the scope of the present disclosure, including methods having greater than or fewer than the number of steps illustrated, as understood from the discussions herein.

Each step or portion of methods 500 may be performed utilizing, or to operate, deploying stepways 100 that are illustrated and discussed herein with reference to FIGS. 1-17. Likewise, any of the features, functions, structures, portions, etc. of deploying stepways 100 that are discussed herein with reference to FIG. 18 may be included in and/or utilized with the examples of FIGS. 1-17 without departing from the scope of the present disclosure.

As shown in FIG. 18, methods 500 comprise deploying 505 the deploying stepway from a stowed configuration to a stair configuration, and transitioning 530 the deploying stepway from the stowed configuration to a ladder configuration. Methods 500 may include locking 545 the deploying stepway in a stepway configuration, unlocking 550 the deploying stepway, and/or stowing 555 the deploying stepway.

The deploying 505 comprises translating 510 a step assembly of the deploying stepway outwardly from a guide frame of the step assembly. More specifically, the translating 510 comprises translating the step assembly 110 in a forward direction 340 such that a proximal portion 112 and a distal portion 114 of the step assembly 110 extend from the guide frame 180. The translating 510 may include maintaining at least a portion of a carriage 116 of the step assembly 110 within or engaged with the guide frame 180, as discussed herein.

The deploying 505 also comprises pivoting 515 the step assembly relative to the guide frame in a first direction to a declined stair angle with a proximal end of the step assembly received in the guide frame. As discussed herein, the proximal end 314 of the step assembly 110 may be comprised in or defined by the carriage 116. In some examples, the pivoting 515 comprises pivoting a step frame 118 of the step assembly 110 relative to the carriage 116 and/or about pivot connections 170 that couple the step frame 118 to the carriage 116. In some examples, the pivoting 515 comprises transitioning the step assembly 110 from a condensed configuration to an operable, expanded, or non-condensed configuration. In some examples, the pivoting 515 comprises increasing a step height 319 between steps 120 of the step assembly 110, as discussed herein. In some examples, the pivoting 515 comprises increasing a rail spacing 334 between a pair of lead support rails 132 and a pair of back support rails 134 of the step frame 118, as discussed herein. In some examples, the pivoting 515 comprises maintaining each step in a level orientation. More specifically, the maintaining each step in a level orientation may comprise pivoting each step relative to the step frame 118, as discussed herein. The pivoting 515 may be performed subsequent to the translating 510.

The deploying 505 further comprises supporting 520 a distal end of the step assembly on a ground surface. In some examples, the supporting 520 comprises supporting feet 138 that define the distal end 316 of the step assembly 110 on the ground surface 220. The supporting 520 may be performed subsequent to the translating 510 and subsequent to the pivoting 515.

The deploying 505 yet further comprises maintaining 525 the proximal portion and the distal portion of the step assembly at least substantially aligned with one another. In some examples, the maintaining 525 includes restricting the distal portion 114 of the step assembly 110 from pivoting in a second direction 324 beyond a threshold alignment angle 326 with the proximal portion 114 of the step assembly, as discussed herein. In some examples, the maintaining 525 comprises utilizing pivot restrictors 154 comprised in a pivot assembly 150 that couples the proximal portion 112 and the distal portion 114 of the step assembly 110 to one another, such as discussed herein. The maintaining 525 may be performed with any suitable sequence of timing within the deploying 505, such as during or subsequent to the pivoting 515 and/or the supporting 520.

In some examples, methods 500 comprise utilizing the deploying stepway 100 in the stair configuration 300, which may include walking up or walking down the step assembly 110. In such examples, the maintaining 525 comprises maintaining the proximal portion 112 and the distal portion 114 of the step assembly 110 at least substantially aligned with one another, while supporting the weight of a user on the step assembly 110.

With continued reference to FIG. 18, methods 500 further include transitioning 530 the deploying stepway from the stowed configuration to a ladder configuration. The transitioning 530 includes translating 535 the distal portion of the step assembly from the guide frame and pivoting 540 the distal portion relative to the proximal portion to a declined ladder angle. More specifically, the pivoting 540 includes pivoting the distal portion 114 about the pivot assembly 150.

The translating 535 generally may include positioning the step assembly 110 in an appropriate position for transitioning to the ladder configuration. In particular, the translating 535 may include translating the pivot assembly 150 from the guide frame 180. More specifically, the translating 535 may include positioning the pivot assembly 150 in the forward direction 340 of a base guide surface 186 of the guide frame 180, such as to permit the pivoting 540. The translating 535 also may include maintaining at least some of, and optionally most of, the proximal portion 112 of the step assembly 110 within the guide frame 180. The translating 535 also may include translating a distal-most portion of the proximal portion of the step assembly 110 to protrude from the guide frame 180.

The pivoting 540 may be performed subsequent to the translating 535. The pivoting 540 may include maintaining the proximal portion 112 of the step assembly 110 in the condensed configuration 336, and pivoting the distal portion 114 of the step assembly 110 away from the condensed configuration 336 and towards an operable, expanded, or non-condensed configuration, as discussed herein. In some examples, the pivoting 540 comprises increasing a rail spacing 334 between the distal rail portions 144 of the pair of lead support rails 132 and the distal rail portions 144 of the pair of back support rails 134, as discussed herein. In some examples, the pivoting 540 comprises increasing a step height 319 between the steps 120 of the distal portion 114 of the step assembly 110, as discussed herein. The pivoting 540 also may include maintaining the steps 120 of the distal portion 114 of the step assembly 110 in a level orientation, which may include pivoting the steps 120 relative to the step frame 118 of the distal portion 114 of the step assembly 110, as discussed herein.

The transitioning 530 also may include maintaining the proximal portion 112 of the step assembly 110 to extend at least substantially parallel to the guide plane 320, as discussed herein. The transitioning 530 further may include restricting the distal portion 114 of the step assembly 110 from pivoting in the first direction 322 beyond a threshold ladder angle 328, as discussed herein. More specifically, the restricting may include utilizing pivot restrictors 154 comprised in the pivot assembly 150, as discussed herein. The restricting also may include supporting the weight of a user on the step assembly. The transitioning 530 may be performed with any suitable sequence or timing within methods 500, such as prior to or subsequent to the deploying 505.

With continued reference to FIG. 18, methods 500 may include locking 545 the deploying stepway in a stepway configuration. More specifically, the locking 545 comprises restricting the step assembly 110 from translating relative to the guide frame 180. The locking 545 may include locking the deploying stepway 100 in at least one of the ladder configuration 302, the stair configuration 300, or the stowed configuration 304, as discussed herein. The locking 545 may include utilizing the locking mechanism 190 or the pair of locking mechanisms 190 comprised in guide frame 180, as discussed herein. The locking 545 also may include transitioning the locking mechanism 190 from a releasing configuration to a locking configuration 350. The locking 545 further may include engaging the locking mechanism 190 with a selected interlock member comprised in step assembly 110.

More specifically, for examples in which the locking 545 includes locking the deploying stepway 100 in the stair configuration 300, the locking 545 may include engaging the locking mechanism 190 with an interlock member 192 attached to the carriage 116 of step assembly 110. For examples in which the locking 545 includes locking the deploying stepway 100 in the ladder configuration 302, the locking 545 may include engaging the locking mechanism 190 with an interlock member 192 attached to the step frame 118 of step assembly 110 adjacent to, and in the proximal direction of, the pivot assembly 150. For examples in which the locking 545 includes locking the deploying stepway 100 in the stowed configuration 304, the locking 545 may include engaging the locking mechanism 190 with an interlock member 192 positioned adjacent to a distal end of the step assembly 110, as discussed herein.

The locking 545 may be performed with any suitable sequence or timing within methods 500 such as prior to, during, or subsequent to the deploying 505 and the transitioning 530.

Methods 500 also may include unlocking 550 the step assembly from the guide frame 180 to permit translation of the step assembly relative to the guide frame. The unlocking 550 may be performed for examples in which methods 500 comprise the locking 545. The unlocking 550 also may be performed prior to and/or to initiate the deploying 505, the transitioning 530, stowing 555, and/or subsequent to stowing 555. Specifically, the unlocking 550 may be performed prior to the deploying 505 and/or prior to the transitioning 530 for examples in which methods 500 comprise locking 545 the deploying stepway 100 in the stowed configuration 304. The unlocking 550 may be performed prior to stowing 555 for examples in which methods 500 include locking 545 the deploying stepway 100 in the ladder configuration 302 and/or the stair configuration 300. The unlocking 550 may include transitioning the locking mechanism 190, or pair of locking mechanisms 190, from the locking configuration 350 to the releasing configuration, as discussed herein.

Methods 500 further may include stowing 555 the deploying stepway. The stowing 555 includes stowing the step assembly 110 in the guide frame 180. More specifically, the stowing 555 may include translating the step assembly 110 in a rear direction 342 into the guide frame 180. The stowing 555 also may include positioning at least a substantial portion of, and optionally the entirety of, the step assembly 110 within the guide frame 180. In some examples, the stowing 555 comprises stowing the step assembly 110 in the condensed configuration 336. Accordingly, the stowing 555 may include transitioning the step assembly 110 to the condensed configuration 336, such as prior to translating the step assembly 110 into the guide frame 180, such as discussed herein.

In some examples, the stowing 555 may include transitioning the deploying stepway from the stair configuration 300 to the stowed configuration 304. In such examples, the stowing 555 may be performed subsequent to the deploying 505. In such examples, the stowing 555 comprises pivoting the step assembly 110, or the distal portion 114 and the proximal portion 112 thereof, in the second direction 324 to be at least substantially aligned with the carriage 116 and/or at least substantially parallel to the guide plane 320, as discussed herein. In such examples, the stowing 555 further and/or subsequently includes translating the step assembly 110 into the guide frame 180, such as along the guide plane 320.

In some examples, the stowing 555 comprises transitioning the deploying stepway 100 from the ladder configuration 302 to the stowed configuration 304. Accordingly, the stowing 555 may be performed subsequent to the transitioning 530. In such examples, the stowing 555 comprises pivoting the distal portion 114 of the step assembly 110 into alignment with the proximal portion 112 of the step assembly 110. More specifically, the pivoting includes pivoting the distal portion 114 in the second direction 324 about the pivot assembly 150. The pivoting also may include transitioning the distal portion 114 of the step assembly 110 to the condensed configuration 336, as discussed herein. In such examples, the stowing 555 further, or subsequently, includes translating the pivot assembly 150 and the distal portion 114 into the guide frame 180, as discussed herein. In some examples, the stowing 555 is performed between the deploying 505 and the transitioning 530.

Illustrative, non-exclusive examples of inventive subject matter according to the present disclosure are described in the following enumerated paragraphs:

A. A deploying stepway for a vehicle, the deploying stepway comprising:
- a step assembly comprising a plurality of steps and a step frame that is pivotally coupled to and supports the plurality of steps, wherein the step frame comprises a pivot assembly positioned along a length of the step frame, wherein the step assembly comprises a proximal portion defined on one side of the pivot assembly and a distal portion defined on the other side of the pivot assembly, wherein the pivot assembly is configured to permit the proximal portion and the distal portion to selectively pivot relative to one another about the pivot assembly;
- a guide frame configured to be secured to the vehicle and to selectively receive and support the step assembly;
- wherein the deploying stepway is configured to be selectively transitioned among a plurality of stepway configurations that comprises:
  - a stair configuration in which the step assembly extends from the guide frame at a declined stair angle and in which the proximal portion and the distal portion of the step assembly are at least substantially aligned with one another;
  - a ladder configuration in which the distal portion of the step assembly is pivoted about the pivot assembly relative to the proximal portion of the step assembly and extends from the guide frame at a declined ladder angle; and
  - a stowed configuration in which the proximal portion and the distal portion are at least substantially aligned with one another and at least a substantial portion of the step assembly is received within the guide frame.

A1. The deploying stepway of paragraph A, wherein the declined ladder angle is less than the declined stair angle.

A2. The deploying stepway of any of paragraphs A-A1, wherein the declined ladder angle is at least 60 degrees (°), at least 70°, at least 80°, at least 90°, at least 95°, at least 100°, at least 110°, at most 90°, at most 95°, at most 100°, at most 110°, at most 115°, at most 120°, and/or at most 130°.

A3. The deploying stepway of any of paragraphs A-A2, wherein the step assembly further comprises a carriage that is at least partially received within the guide frame when the deploying stepway is in any of the stowed configuration, the stair configuration, and the ladder configuration.

A4. The deploying stepway of paragraph A3, wherein a proximal end of the step frame is pivotally coupled to the carriage, and wherein the step frame is configured to pivot relative to the carriage when the deploying stepway is transitioned between the stowed configuration and the stair configuration.

A5. The deploying stepway of any of paragraphs A3-A4, wherein the carriage comprises a landing step.

A6. The deploying stepway of any of paragraphs A-A5, wherein the proximal portion and the distal portion of the step assembly each comprise one or more steps of the plurality of steps.

A7. The deploying stepway of any of paragraphs A-A6, wherein the guide frame defines a guide plane that the guide frame is configured to guide translation of the step assembly along within the guide frame, wherein each step of the plurality of steps defines a tread plane, wherein the step frame supports the plurality of steps with each tread plane thereof being at least substantially parallel to the guide plane of the guide frame when the deploying stepway is in the stair configuration and the ladder configuration.

A8. The deploying stepway of paragraph A7, wherein the step frame supports the plurality of steps with each tread plane thereof being at least substantially parallel to the guide plane when the deploying stepway is in the stowed configuration.

A9. The deploying stepway of any of paragraphs A-A8, wherein at least some of the proximal portion of the step assembly is received within the guide frame when the deploying stepway is in the ladder configuration.

A10. The deploying stepway of any of paragraphs A-A9, wherein at least a substantial portion of the proximal portion of the step assembly extends from the guide frame when the deploying stepway is in the stair configuration.

A11. The deploying stepway of any of paragraphs A-A10, wherein the proximal portion of the step assembly extends at least parallel to a/the guide plane, defined by the guide frame when the deploying stepway is in the ladder configuration.

A12. The deploying stepway of any of paragraphs A-A11, wherein the pivot assembly operatively couples the proximal portion of the step assembly to the distal portion of the step assembly.

A13. The deploying stepway of any of paragraphs A-A12, wherein when the deploying stepway is transitioned towards the ladder configuration from the stowed configuration, the distal portion of the step assembly is pivoted relative to the proximal portion of the step assembly in a first direction.

A14. The deploying stepway of any of paragraphs A-A13, wherein the pivot assembly is configured to permit the distal portion of the step assembly to pivot in a second direction towards alignment with the proximal portion of the step assembly, wherein the second direction is opposite to a/the first direction, and wherein the pivot assembly is configured to restrict the distal portion of the step assembly from pivoting beyond alignment with the proximal portion in the second direction.

A15. The deploying stepway of paragraph A14, wherein the pivot assembly is configured to restrict the distal portion of the step assembly from pivoting beyond a threshold alignment angle relative to the proximal portion in the second direction, wherein the threshold alignment angle is at least 160°, at least 170°, at least 175°, at least 180°, at most 180°, at most 182°, at most 185°, and/or at most 190°.

A16. The deploying stepway of any of paragraphs A14-A15, wherein the pivot assembly is configured to restrict the distal portion of the step assembly from pivoting in the first direction beyond a threshold ladder angle relative to the proximal portion, wherein the threshold ladder angle is at least 60°, at least 70°, at least 80°, at least 90°, at least 95°, at least 100°, at least 110°, at most 90°, at most 95°, at most 100°, at most 110°, at most 115°, at most 120°, and/or at most 130°.

A17. The deploying stepway of paragraph A16, wherein the pivot assembly is configured to restrict pivotal movement of the distal portion relative to the proximal portion to between the threshold alignment angle and the threshold ladder angle.

A18. The deploying stepway of any of paragraphs A-A17, wherein the pivot assembly further comprises at least one pivot lock mechanism configured to selectively secure the proximal portion at one or more selected pivot angles relative to the distal portion.

A19. The deploying stepway of any of paragraphs A-A18, wherein the step frame comprises a set of support rails, wherein each support rail is pivotally coupled to a/the carriage and to the plurality of steps, wherein the set of support rails comprises a pair of lead support rails and a pair of back support rails, wherein the pair of lead support rails and the pair of back support rails are pivotally coupled to each step of the plurality of steps spaced apart from one another along a run length of each step, with the pair of lead support rails being coupled to each step forward of the pair of back support rails.

A20. The deploying stepway of paragraph A19, wherein the pair of lead support rails are pivotally coupled to the carriage spaced forward of the pair of back support rails by a horizontal rail offset.

A21. The deploying stepway of paragraph A19-A20, wherein the pair of lead support rails are coupled to the carriage spaced above the pair of back support rails by a vertical rail offset of at least a width of a support rail.

A22. The deploying stepway of paragraphs A19-A21, wherein the pair of lead support rails are pivotally coupled to each step of the plurality of steps with a/the vertical rail offset and/or a/the horizontal rail offset from the pair of back support rails.

A23. The deploying stepway of any of paragraphs A19-A22, wherein a rail spacing between at least a portion of the pair of lead support rails and at least a corresponding portion of the pair of back support rails is adjusted when a distal end of the step assembly is moved relative to a proximal end of the step assembly.

A24. The deploying stepway of paragraph A23, wherein the rail spacing between the pair of lead support rails and the pair of back support rails decreases as the step assembly is transitioned towards the stowed configuration from the stair configuration and/or from the ladder configuration.

A25. The deploying stepway of any of paragraphs A19-A24, wherein a/the pair of lead support rails are pivotally coupled to each step of the plurality of steps, spaced apart from one another along a step width of each step, and wherein the pair of back support rails are pivotally coupled to each step of the plurality of steps, spaced apart from one another along the step width of each step.

A26. The deploying stepway of any of paragraphs A19-A25, wherein each support rail of the set of support rails comprises a pivot mechanism that is configured to permit a distal rail portion of each support rail to selectively pivot relative to a proximal rail portion of each support rail, wherein the pivot mechanisms of the set of support rails collectively form the pivot assembly of the step frame.

A27. The deploying stepway of paragraph A26, wherein the pivot mechanisms of the set of support rails are positioned adjacent to a common step of the plurality of steps.

A28. The deploying stepway of any of paragraphs A26-A27, wherein the pivot mechanisms of the pair of lead support rails are aligned with one another along a length of the step frame and the pivot mechanisms of the pair of back support rails are aligned with one another along the length of the step frame, and wherein the pivot mechanisms of the pair of back support rails are offset in a distal direction from the pivot mechanisms of the pair of lead support rails.

A29. The deploying stepway of any of paragraphs A26-A28, wherein, in the ladder configuration, the pivot mechanisms of the pair of lead support rails are positioned further from the guide frame than the pivot mechanisms of the pair of back support rails.

A30. The deploying stepway of any of paragraphs A26-A29, wherein each pivot mechanism operatively couples the proximal rail portion to the distal rail portion of the respective support rail.

A31. The deploying stepway of any of paragraphs A26-A30, wherein each pivot mechanism comprises a proximal pivot mechanism portion fixed to the proximal rail portion and a distal pivot mechanism portion fixed to the distal rail portion, and a pin coupling that pivotally couples the proximal pivot mechanism portion to the distal pivot mechanism portion.

A32. The deploying stepway of paragraph A31, wherein, in at least one pivot mechanism, the proximal pivot mechanism portion comprises a proximal alignment restricting surface and the distal pivot mechanism comprises a distal alignment restricting surface, wherein the proximal alignment restricting surface and the distal alignment surface are configured to engage with one another to restrict the proximal rail portion and the distal rail portion of the respective support rail from pivoting in a/the second direction about the respective pivot mechanism beyond a/the threshold alignment angle.

A33. The deploying stepway of any of paragraphs A31-A32, wherein, in at least one pivot mechanism, the proximal pivot mechanism portion comprises a proximal ladder restricting surface and the distal pivot mechanism comprises a distal ladder restricting surface, wherein the proximal ladder restricting surface and the distal ladder restricting surface are configured to engage with one another to restrict the proximal rail portion and the distal rail portion of the respective support rail from pivoting in a/the first direction about the respective pivot mechanism beyond a/the threshold ladder angle.

A34. The deploying stepway of any of paragraphs A26-A33, wherein the proximal rail portions of the pair of leading rail portions are positioned at a minimum rail spacing from the proximal rail portions of the pair of back rail portions in the ladder configuration.

A35. The deploying stepway of any of paragraphs A26-A34, wherein the distal rail portions of the pair of lead support rails extend at least substantially parallel to the distal rail portions of the back support rails in the ladder configuration.

A36. The deploying stepway of any of paragraphs A19-A35, wherein the step frame is dimensioned to translate to within and from within the guide frame when the pair of lead support rails are positioned at a/the minimum rail spacing from the pair of back support rails.

A37. The deploying stepway of any of paragraphs A19-A36, wherein the pair of back support rails are configured to support the step assembly on a ground surface in the stair configuration and optionally in the ladder configuration.

A38. The deploying stepway of paragraph A37, wherein the step assembly further comprises a pair of feet pivotally mounted on a/the distal ends of the pair of back support rails and configured to support the pair of back support rails on the ground surface.

A39. The deploying stepway of paragraph A38, wherein the guide frame comprises a pair of foot slots that receive the pair of feet in the stowed configuration.

A40. The deploying stepway of any of paragraphs A19-A39, wherein the step assembly comprises a condensed configuration in which the set of support rails extend at least substantially parallel to a/the tread planes of the plurality of steps, and in which the pair of lead support rails are positioned at a/the minimum rail spacing from the pair of back support frames.

A41. The deploying stepway of paragraph A40, wherein the plurality of stepway configurations further comprises a ramp configuration, wherein in the ramp configuration, the step assembly is in the condensed configuration, the step assembly extends from the guide frame at a declined ramp angle that is at least substantially the same as or greater than the declined stair angle, and the proximal portion and the distal portion of the step assembly are at least substantially aligned with one another.

A42. The deploying stepway of paragraph A41, when depending from paragraph A3, wherein the carriage extends from the guide frame at the declined ramp angle in the ramp configuration, and wherein the carriage comprises a ramp coupling mechanism that is configured to selectively couple the carriage to the guide frame with the step assembly oriented at the declined ramp angle.

A43. The deploying stepway of any of paragraphs A40-A41, wherein the step assembly further comprises a condensed configuration lockout mechanism configured to selectively secure the step assembly in the condensed configuration.

A44. The deploying stepway of any of paragraphs A-A43, wherein the plurality of steps pivot relative to the step frame when the step assembly is transitioned between the stowed configuration and the stair configuration, and wherein a portion of the plurality of steps pivot relative to the step frame when the deploying stepway is transitioned between the stowed configuration and the ladder configuration.

A45. The deploying stepway of any of paragraphs A-A44, wherein the step assembly comprises a plurality of the pivot mechanisms, wherein the plurality of pivot mechanisms are spaced apart from one another along the length of the step frame.

A46. The deploying stepway of paragraph A45, wherein each pivot mechanism of the plurality of pivot mechanisms is positioned adjacent to a corresponding step of the plurality of steps.

A47. The deploying stepway of any of paragraphs A-A46, wherein the step assembly is configured to translate to within and from within the guide frame between the stowed configuration and either of the stair configuration and the ladder configuration.

A48. The deploying stepway of any of paragraphs A-A47, wherein the guide frame is configured to constrain motion of the step assembly relative to the guide frame to one or more predefined paths.

A49. The deploying stepway of any of paragraphs A-A48, wherein the guide frame comprises a plurality of guide surfaces that are configured to contact, support, and guide translation of the step assembly within the guide frame.

A50. The deploying stepway of any of paragraphs A-A49, wherein the guide frame comprises a pair of tracks that extend at least substantially parallel to and spaced apart from one another, wherein each track of the pair of tracks comprises a base guide surface of a/the plurality of guide surfaces that at least partially defines a/the guide plane.

A51. The deploying stepway of any of paragraphs A-A50, wherein the step assembly comprises a plurality of guide features that are configured to engage with a/the plurality of guide surfaces of the guide frame to guide translation of the step assembly within the step frame.

A52. The deploying stepway of paragraph A51, wherein the guide frame comprises a plurality of frame guides that collectively comprise at least some of the plurality of guide surfaces, wherein the plurality of frame guides are mounted or defined within the pair of tracks, and wherein the plurality of frame guides, of the guide frame, and the plurality of guide features, of the step assembly, are configured to mate to cooperatively guide translation of the step assembly relative to the guide frame.

A53. The deploying stepway of any of paragraphs A-A52, wherein one or more of the step assembly and the guide frame comprises one or more pad up features that are configured to restrict movement of the step assembly within the guide frame, at least when deploying stepway is in the stowed configuration.

A54. The deploying stepway of any of paragraphs A-A53, wherein the guide frame comprises a locking mechanism configured to selectively restrict translation of the step assembly relative to the guide frame.

A55. The deploying stepway of paragraph A54, wherein the locking mechanism is configured to restrict translation of the step assembly relative to the guide frame when the deploying stepway is in the stair configuration, the ladder configuration, and the stowed configuration.

A56. The deploying stepway of any of paragraphs A54-A55, wherein the step assembly comprises a plurality of interlock members, wherein each interlock member is configured to interlock with the locking mechanism to secure the step assembly relative to the guide frame in a corresponding stepway configuration of the plurality of stepway configurations.

A57. The deploying stepway of paragraph A56, wherein the plurality of interlock members comprises at least one of:
 a stair configuration interlock member that is positioned on a/the carriage;
 a ladder configuration interlock member that is positioned on the step frame adjacent to, and in a proximal direction of the pivot assembly; and
 a stowed configuration interlock member that is positioned along the step frame adjacent to a distal end of the step frame.

A58. The deploying stepway of any of paragraphs A54-A57, wherein the guide frame comprises a pair of locking mechanisms, wherein the locking mechanism is one of the pair of locking mechanisms, wherein the step assembly comprises a plurality of pairs of interlock members, wherein each interlock member of the plurality of interlock members is one of a pair of interlock members of the plurality of pairs of interlock members, and wherein each pair of interlocking members is configured to interlock with the pair of locking mechanisms to secure the step assembly relative to the guide frame in the corresponding stepway configuration of the plurality of stepway configurations.

A59. The deploying stepway of paragraph A58, wherein the pair of locking mechanisms are disposed on opposing lateral sides of the guide frame, and wherein each pair of interlocking members are along opposing lateral sides of the step frame.

B. A vehicle comprising the deploying stepway of any of paragraphs A-A59.

B1. The vehicle of paragraph B, wherein the guide frame is mounted on the vehicle proximate to an elevated point of egress, and wherein the deploying stepway is configured to provide access to the elevated point of egress.

C. A method of operating a deploying stepway for a vehicle, the method comprising:
 deploying the deploying stepway from a stowed configuration to a stair configuration, wherein the deploying comprises:
  translating a step assembly of the deploying stepway outwardly from a guide frame of the step assembly such that a proximal portion and a distal portion of the step assembly extend from the guide frame;
  pivoting the step assembly relative to the guide frame in a first direction to a declined stair angle with a proximal end of the step assembly received in the guide frame;
  supporting a distal end of the step assembly on a ground surface; and
  maintaining the proximal portion and the distal portion of the step assembly at least substantially aligned with one another;
 transitioning the deploying stepway from the stowed configuration to a ladder configuration, wherein the transitioning comprises:
  translating the distal portion of the step assembly from the guide frame, wherein a pivot assembly connects the distal portion to the proximal portion of the step assembly; and
  pivoting, about the pivot assembly, the distal portion relative to the proximal portion in the first direction to a declined ladder angle.

C1. The method of paragraph C, wherein the transitioning further comprises supporting the proximal portion to extend at least substantially parallel to a guide plane defined by the guide frame.

C2. The method of any of paragraphs C-C1, wherein the method further comprises locking the deploying stepway in at least one of the ladder configuration, the stair configuration, or the stowed configuration, wherein the locking comprises restricting the step assembly from translating relative to the guide frame.

C3. The method of any of paragraphs C-C2, further comprising:
 stowing the deploying stepway, wherein the stowing comprises stowing the step assembly in the guide frame.

C4. The method of paragraph C3, wherein the stowing further comprises:
 transitioning the deploying stepway from the ladder configuration to the stowed configuration, wherein the transitioning the deploying stepway from the stair configuration to the stowed configuration comprises:
 pivoting the distal portion of the step assembly about the pivot assembly in a second direction relative to the proximal portion of the step assembly and into alignment with the proximal portion of the step assembly, wherein the second direction is opposite to the first direction; and
 translating the pivot assembly and the distal portion of the step assembly into the guide frame.

C5. The method of paragraph C4, wherein the pivoting the distal portion of the step assembly in the second direction comprises transitioning the distal portion of the step assembly to a condensed configuration.

C6. The method of any of paragraphs C3-C5, wherein the stowing comprises transitioning the deploying stepway from the stair configuration to the stowed configuration, wherein the transitioning the deploying stepway from the stair configuration to the stowed configuration comprises:
 pivoting the step assembly relative to the guide frame in a/the second direction to be at least substantially parallel to a/the guide plane defined by the guide frame; and
 translating the step assembly into the guide frame.

C7. The method of any of paragraphs C-C6, wherein the step assembly comprises a plurality of steps and a step frame that is pivotally coupled to and supports the plurality of steps, wherein the method further comprises maintaining each step in a level orientation during the deploying and the transitioning, wherein the maintaining comprises pivoting each step relative to the support frame.

C8. The method of any of paragraphs C-C7, further comprising unlocking the step assembly from the guide frame to permit translation of the guide frame, wherein the unlocking is performed to initiate the deploying and/or the transitioning the deploying stepway from the stowed configuration.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

Unless specifically defined otherwise, "at least substantially," as used herein when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A deploying stepway for a vehicle, the deploying stepway comprising:
a step assembly comprising a plurality of steps and a step frame that is pivotally coupled to and supports the plurality of steps, wherein the step frame comprises a pivot assembly positioned along a length of the step frame, wherein the step assembly includes a proximal portion defined on one side of the pivot assembly and a distal portion defined on the other side of the pivot assembly, wherein the pivot assembly is configured to permit the proximal portion and the distal portion to selectively pivot relative to one another about the pivot assembly; and a guide frame configured to be secured to the vehicle and to selectively receive and support the step assembly;

wherein the deploying stepway is configured to be selectively transitioned among a plurality of stepway configurations that comprises:

a stair configuration in which the step assembly extends from the guide frame at a declined stair angle and in which the proximal portion and the distal portion of the step assembly are at least substantially aligned with one another;

a ladder configuration in which the distal portion of the step assembly is pivoted about the pivot assembly relative to the proximal portion of the step assembly and extends from the guide frame at a declined ladder angle; and a stowed configuration in which the proximal portion and the distal portion are at least substantially aligned with one another and at least a substantial portion of the step assembly is received within the guide frame.

2. The deploying stepway of claim 1, wherein the declined ladder angle is less than the declined stair angle.

3. The deploying stepway of claim 2, wherein the declined ladder angle at least 80 degrees (°) and at most 120°.

4. The deploying stepway of claim 1, wherein the step assembly further comprises a carriage that is at least partially received within the guide frame when the deploying stepway is in any of the stowed configuration, the stair configuration, and the ladder configuration.

5. The deploying stepway of claim 4, wherein a proximal end of the step frame is pivotally coupled to the carriage, and wherein the step frame is configured to pivot relative to the carriage when the deploying stepway is transitioned between the stowed configuration and the stair configuration.

6. The deploying stepway of claim 1, wherein the proximal portion and the distal portion of the step assembly each comprise one or more steps of the plurality of steps.

7. The deploying stepway of claim 6, wherein the guide frame defines a guide plane that the guide frame is configured to guide translation of the step assembly along within the guide frame, wherein each step of the plurality of steps defines a tread plane, wherein the step frame supports the plurality of steps with each tread plane thereof being at least substantially parallel to the guide plane of the guide frame when the deploying stepway is in the stair configuration, the ladder configuration, and the stowed configuration.

8. The deploying stepway of claim 1, wherein at least some of the proximal portion of the step assembly is received within the guide frame when the deploying stepway is in the ladder configuration.

9. The deploying stepway of claim 1, wherein the proximal portion of the step assembly extends at least substantially parallel to a guide plane defined by the guide frame when the deploying stepway is in the ladder configuration.

10. The deploying stepway of any of claim 1, wherein the pivot assembly operatively couples the proximal portion of the step assembly to the distal portion of the step assembly.

11. The deploying stepway of claim 1, wherein when the deploying stepway is transitioned towards the ladder configuration from the stowed configuration, the distal portion of the step assembly is pivoted relative to the proximal portion of the step assembly in a first direction, wherein the pivot assembly is configured to permit the distal portion of the step assembly to pivot in a second direction towards alignment with the proximal portion of the step assembly, wherein the second direction is opposite to the first direction, and wherein the pivot assembly is configured to restrict the distal portion of the step assembly from pivoting beyond alignment with the proximal portion of the step assembly in the second direction.

12. The deploying stepway of claim 11, wherein the pivot assembly is configured to restrict the distal portion of the step assembly from pivoting in the first direction beyond a threshold ladder angle relative to the proximal portion of the step assembly, wherein the threshold ladder angle is at least 80° and at most 120°.

13. The deploying stepway of claim 1, wherein the step assembly further comprises a carriage that is at least partially received within the guide frame when the deploying stepway is in any of the stowed configuration and the stair configuration, wherein the step frame comprises a set of support rails, wherein each support rail is pivotally coupled to the carriage and to the plurality of steps, wherein the set of support rails comprises a pair of lead support rails and a pair of back support rails, wherein the pair of lead support rails and the pair of back support rails are pivotally coupled to each step of the plurality of steps spaced apart from one another along a run length of each step, with the pair of lead support rails being coupled to each step forward of the pair of back support rails.

14. The deploying stepway of claim 13, wherein the pair of lead support rails are pivotally coupled to the carriage spaced forward of the pair of back support rails by a horizontal rail offset, wherein the pair of lead support rails are pivotally coupled to the carriage spaced above the pair of back support rails by a vertical rail offset, and wherein the pair of lead support rails are pivotally coupled to each step of the plurality of steps with the vertical rail offset and the horizontal rail offset from the pair of back support rails.

15. The deploying stepway of claim 13, wherein each support rail comprises a pivot mechanism that is configured to permit a distal rail portion of each support rail to selectively pivot relative to a proximal rail portion of each support rail, wherein the pivot mechanisms of the set of support rails collectively form the pivot assembly of the step frame.

16. The deploying stepway of claim 13, wherein the pair of back support rails are configured to support the step assembly on a ground surface in the stair configuration.

17. The deploying stepway of claim 13, wherein the step assembly is configured to translate to within and from within the guide frame between the stowed configuration and either of the stair configuration and the ladder configuration, and wherein the step frame is dimensioned to translate to within and from within the guide frame when the pair of lead support rails are positioned at a minimum rail spacing from the pair of back support rails.

18. The deploying stepway of claim 1, wherein the plurality of steps pivot relative to the step frame when the step assembly is transitioned between the stowed configuration and the stair configuration, and wherein a subset of the plurality of steps pivot relative to the step frame when the deploying stepway is transitioned between the stowed configuration and the ladder configuration.

19. The deploying stepway of claim 1, wherein the guide frame comprises a locking mechanism configured to selectively restrict translation of the step assembly relative to the guide frame, and the locking mechanism is configured to restrict translation of the step assembly relative to the guide frame when the deploying stepway is in each of the stair configuration, the ladder configuration, and the stowed configuration.

20. A method of operating the deploying stepway of claim 1, the method comprising:

deploying the deploying stepway from the stowed configuration to the stair configuration, wherein the deploying comprises:
  translating the step assembly of the deploying stepway outwardly from the guide frame of the step assembly such that the proximal portion and the distal portion of the step assembly extend from the guide frame;
  pivoting the step assembly relative to the guide frame in a first direction to the declined stair angle with a proximal end of the step assembly received in the guide frame;
  supporting a distal end of the step assembly on a ground surface; and
  maintaining the proximal portion and the distal portion of the step assembly at least substantially aligned with one another;
transitioning the deploying stepway from the stowed configuration to the ladder configuration, wherein the transitioning comprises:
  translating the distal portion of the step assembly from the guide frame; and
  pivoting, about the pivot assembly, the distal portion relative to the proximal portion in the first direction to the declined ladder angle.

* * * * *